United States Patent
Goodenough et al.

(10) Patent No.: US 12,276,493 B2
(45) Date of Patent: Apr. 15, 2025

(54) METHOD AND APPARATUS FOR CHARACTERIZING OBJECTS USING A LIGHT-EMITTING ARRAY

(71) Applicant: Markem-Imaje Corporation, Keene, NH (US)

(72) Inventors: Peter W. Goodenough, Swanzey, NH (US); Cameron Dee Dryden, West Roxbury, MA (US)

(73) Assignee: Markem-Imaje Corporation, Keene, NH (US)

( * ) Notice: Subject to any disclaimer, the term of this patent is extended or adjusted under 35 U.S.C. 154(b) by 280 days.

(21) Appl. No.: 17/870,740

(22) Filed: Jul. 21, 2022

(65) Prior Publication Data
US 2023/0033635 A1    Feb. 2, 2023

Related U.S. Application Data

(60) Provisional application No. 63/225,217, filed on Jul. 23, 2021.

(51) Int. Cl.
G01B 11/25    (2006.01)
G01B 11/02    (2006.01)
F16P 3/14    (2006.01)

(52) U.S. Cl.
CPC ........ *G01B 11/2513* (2013.01); *G01B 11/028* (2013.01); *G01B 11/2518* (2013.01); *F16P 3/144* (2013.01)

(58) Field of Classification Search
CPC .............. G01B 11/2513; G01B 11/028; G01B 11/2518; F16P 3/144; G01V 8/20
See application file for complete search history.

(56) References Cited

U.S. PATENT DOCUMENTS 5,198,661 A    3/1993 Anderson et al.
5,404,008 A    4/1995 Malinowski et al.
(Continued)

FOREIGN PATENT DOCUMENTS

DE    4418036    11/1995
DE    102016116733 B3 *    11/2017    .............. F16P 3/144
(Continued)

OTHER PUBLICATIONS

Gander et al., "Least-Squares Fitting of Circles and Ellipses," Computer Science Department at Stanford University, Dec. 1994, 22 pages.
(Continued)

*Primary Examiner* — Michelle M Iacoletti
*Assistant Examiner* — Judy Dao Tran
(74) *Attorney, Agent, or Firm* — Fish & Richardson P.C.

(57) ABSTRACT

Methods, systems, and apparatus, including medium-encoded computer program products, for a light curtain system including a support frame arranged around a transport path including a product support, a light-emitting array including multiple light sources arranged along the support frame, each light source of the multiple light sources arranged along the support frame at a respective distance above the product support, a detector array including multiple light detectors, where each detector of the multiple light detectors is arranged on the support frame opposite the transport path from a light source of the multiple light sources and at a respective distance above the product support, and a data processing apparatus in data communication with the light-emitting array and the detector array.

20 Claims, 22 Drawing Sheets

(56) References Cited

U.S. PATENT DOCUMENTS

| | | | | | |
|---|---|---|---|---|---|
| 5,583,334 | A | * | 12/1996 | Baumann | G08B 13/183 |
| | | | | | 250/221 |
| 5,923,428 | A | * | 7/1999 | Woodworth | G01B 11/04 |
| | | | | | 700/215 |
| 6,958,465 | B2 | | 10/2005 | Haberer et al. | |
| 8,000,831 | B2 | | 8/2011 | Benayad-Cherif | |
| 8,469,261 | B2 | | 6/2013 | Bonner et al. | |
| 9,122,677 | B2 | | 9/2015 | Bonner et al. | |
| 2002/0070860 | A1 | | 6/2002 | Wuestefeld et al. | |
| 2008/0169225 | A1 | * | 7/2008 | De Greef | B07C 5/3416 |
| | | | | | 209/576 |
| 2019/0001496 | A1 | * | 1/2019 | Lorenzoni | G01V 8/20 |
| 2019/0160493 | A1 | | 5/2019 | Garrett et al. | |

FOREIGN PATENT DOCUMENTS

| | | | | |
|---|---|---|---|---|
| DE | 202018105666 U1 | * | 2/2020 | |
| EP | 2180348 | | 4/2010 | |
| EP | 2180348 A1 | * | 4/2010 | G01V 8/20 |
| EP | 2463688 | | 6/2012 | |
| EP | 2463688 A2 | * | 6/2012 | G01V 8/20 |
| EP | 3133423 | | 2/2017 | |
| EP | 3168655 | | 10/2017 | |
| EP | 3625570 | | 3/2020 | |
| WO | WO 2008/107892 | | 9/2008 | |

OTHER PUBLICATIONS

[No Author Listed], "Safety light curtain ignores fixed objects," Electronic Products, Jan. 2005, 1 page.

Dietrich et al., "Protecting Automated Loading and Unloading Points," Sick AG White Paper, Feb. 2017, 36 pages.

Trimantec.com [online], "Safety Light Curtains: One Way to Safeguard Your Machines," Jan. 2017, retrieved on Nov. 2022, retrieved from URL<https://trimantec.com/blogs/t/safety-light-curtains-q-a>, 1 page.

Extended European Search Report in European Appln No. 22186591. 8, dated Dec. 21, 2022, 9 pages.

* cited by examiner

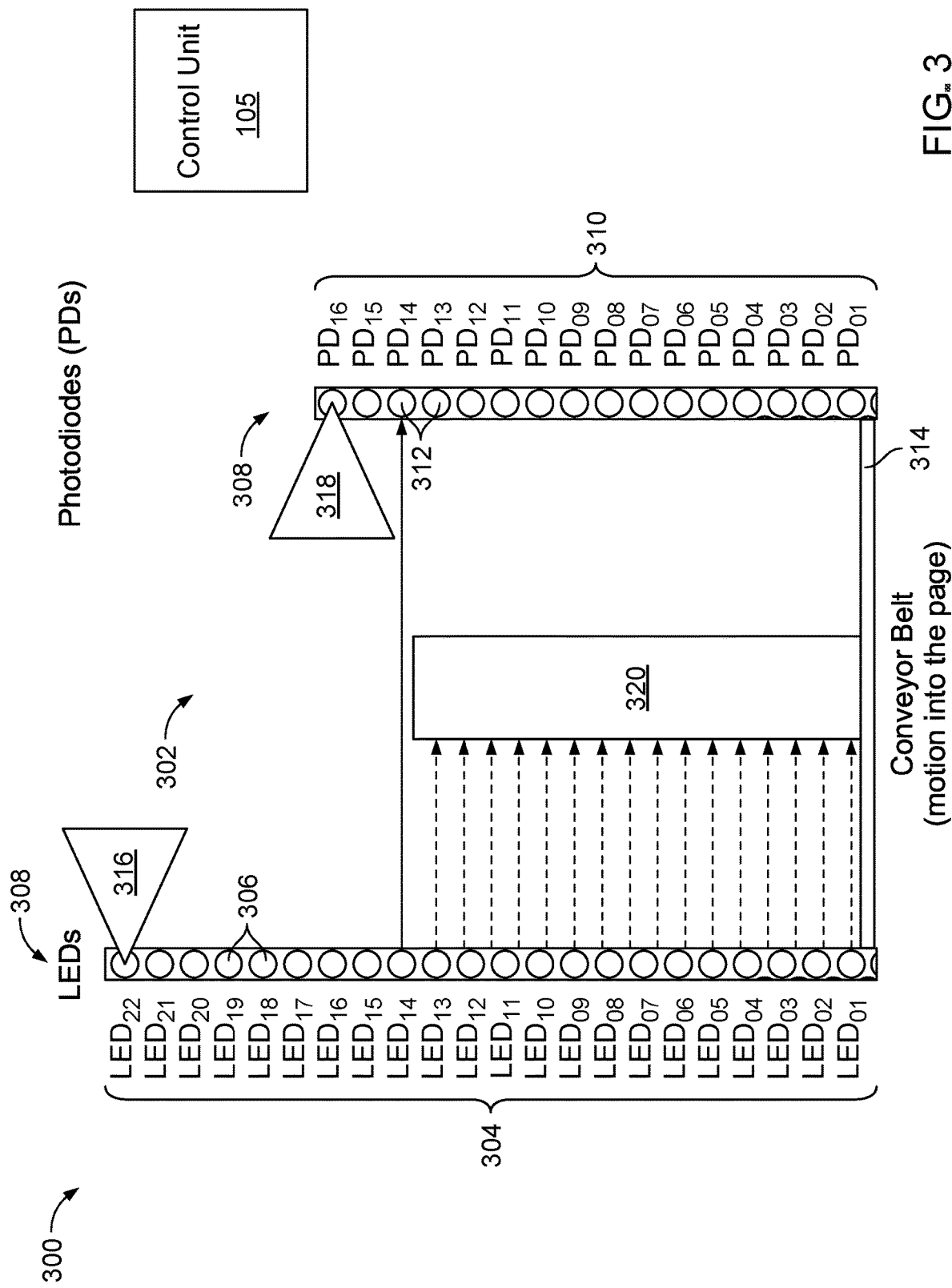

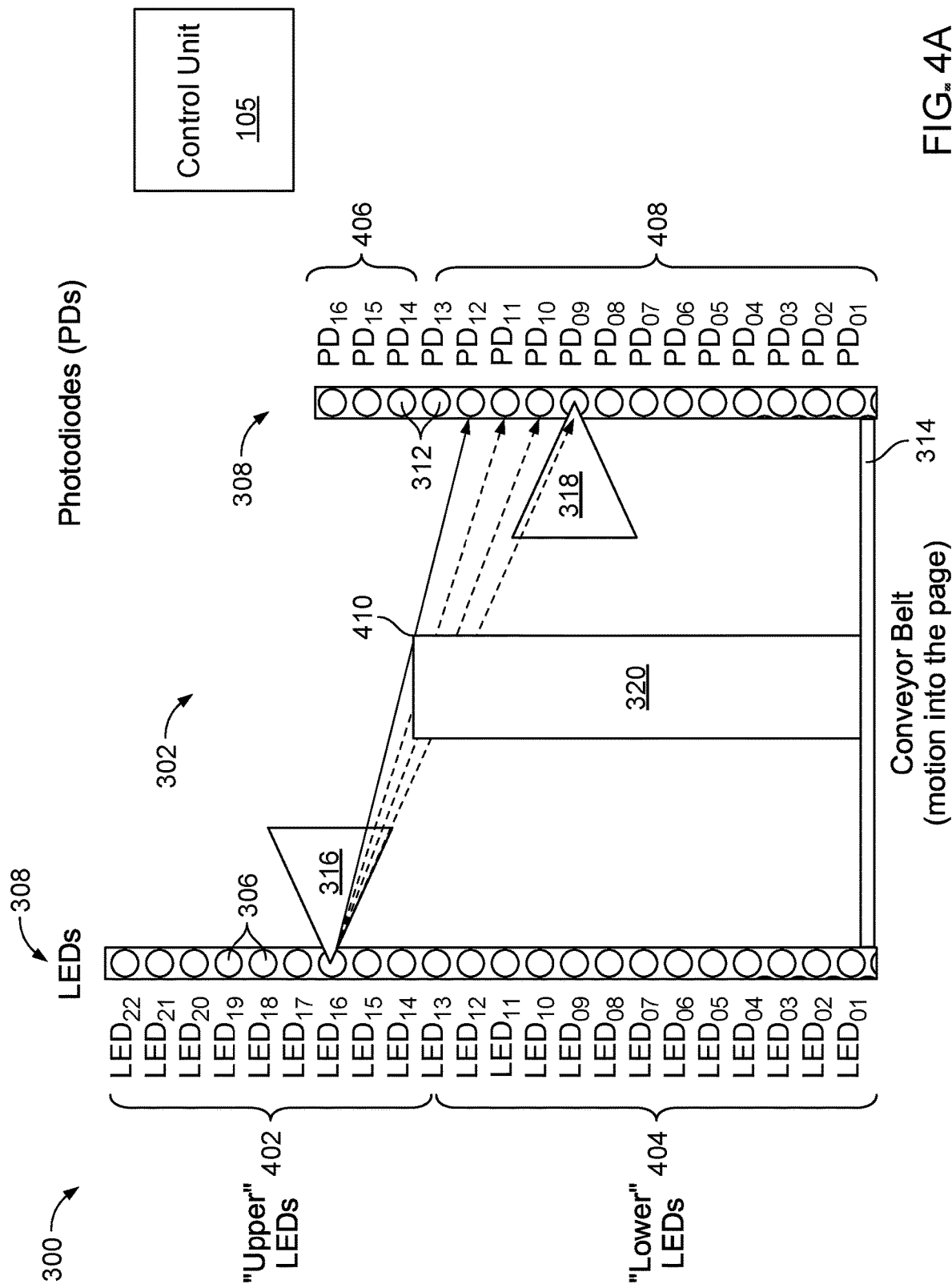

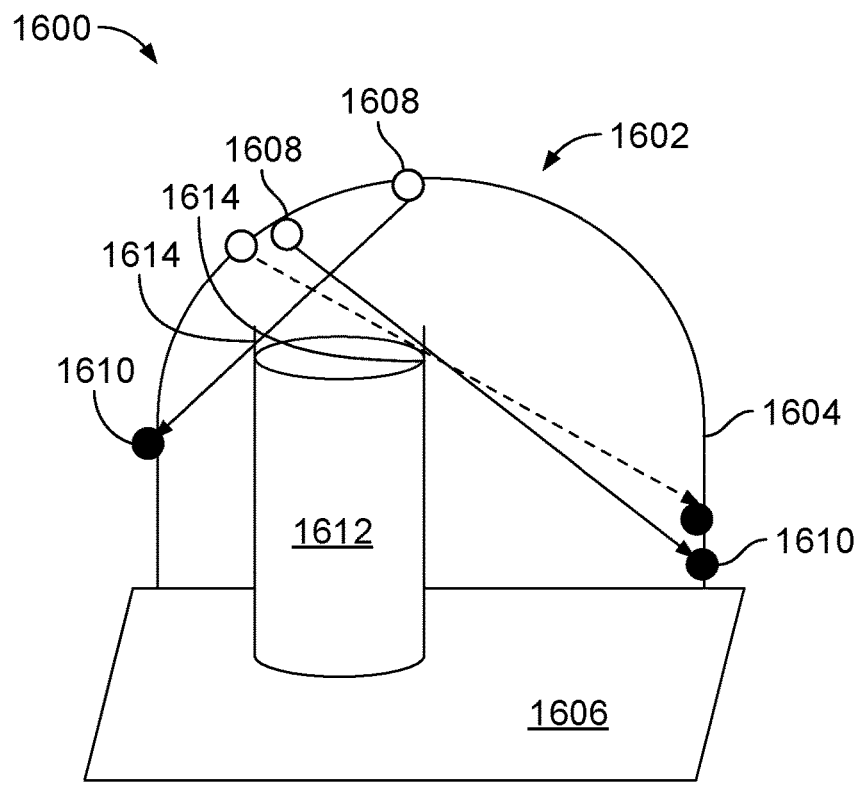
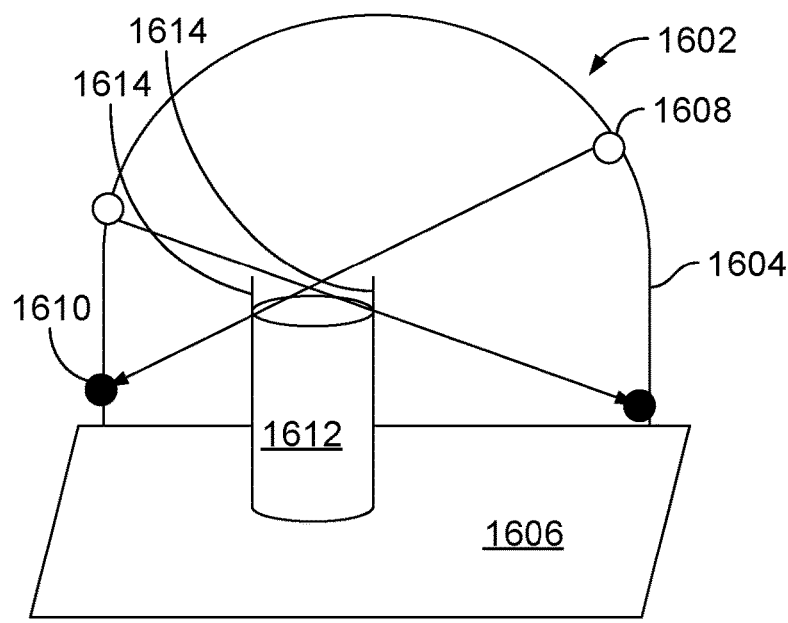
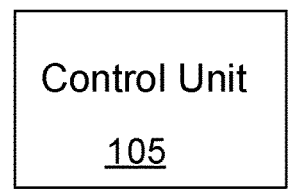
FIG. 16

METHOD AND APPARATUS FOR CHARACTERIZING OBJECTS USING A LIGHT-EMITTING ARRAY

CROSS-REFERENCE TO RELATED APPLICATION

This application claims the benefit of U.S. Provisional Application No. 63/225,217, filed on Jul. 23, 2021, the contents of which are incorporated by reference herein.

BACKGROUND

Light grids of parallel beams, also known as light curtains, can be used, for example, to control automated manufacturing systems or assembly lines, such as in robotic automotive assembly lines, where items enter a specialized assembly area, a manufacturing operation is performed, and the item is moved to a subsequent step. Because the assembly operation may present multiple hazards to personnel, parallel light curtains are often used to detect that a worker has entered a dangerous zone and deactivate the equipment.

SUMMARY

This specification describes technologies relating to detecting, monitoring, and characterizing objects in a monitoring region. In general, one or more aspects of the subject matter described in this specification can be embodied in one or more systems that include a support frame arranged around a transport path including a product support, a light-emitting array including multiple light sources arranged along the support frame, each light source of the multiple light sources arranged along the support frame at a respective distance above the product support, a detector array including multiple light detectors, where each detector of the multiple light detectors is arranged on the support frame opposite the transport path from a light source of the multiple light sources and at a respective distance above the product support, and a data processing apparatus in data communication with the light-emitting array and the detector array. The system including the data processing apparatus is operable to perform the operations including measuring a height of a product on the product support as the product passes through the support frame by at least determining a first detector of the multiple light detectors that detects light from a first light source of the multiple light sources during sequential light signal emissions by the multiple light sources, measuring edge locations of the product by at least determining second detectors of the multiple light detectors that detect light from second light sources of the multiple light sources during light signal emissions by the second light sources, where the second light sources are only those light sources of the multiple light sources that are above or below the first light source of the multiple light sources with respect to the product support, and where the second detectors are only those light detectors of the multiple light detectors that are below or above the first detector, verifying, from the measured height and edge locations of the product, that the product on the product support matches an expected product. In response to determining that the product matches the expected product, the system determines product information including i) a speed of the product, ii) a location of the product, iii) dimensions of the product, iv) a shape of the product, v) product vibration, vi) a product trigger, or vii) a combination thereof; and provides the product information. In response to determining that the product does not match the expected product, the system i) provides an alert, ii) stops further motion of the product on the product support, iii) disables hazardous energy, or iv) a combination thereof.

The foregoing and other implementations can each optionally include one or more of the features described herein, alone or in combination. In particular, one implementation includes all the following features in combination. In some implementations, the support frame includes vertical supports arranged on either side of the transport path including the product support. The light-emitting array can include a first set of light sources arranged on a vertical support located on a right side of the transport path and a second set of light sources arranged on a vertical support located on an opposite, left side of the transport path. In some implementations, the detector array includes a first set of light detectors arranged on the vertical support located on the right side of the transport path and a second set of light detectors arranged on the vertical support located on the left side of the transport path.

In some implementations, the light sources include light-emitting diodes. The light-emitting diodes can have an associated transmission angle, for example, of at least 4° degrees, at least +/−10° degrees, or of at least +/−15° degrees.

In some implementations, each of the light sources is designed to spread light over an angle of at least +/−10° degrees to provide the associated transmission angle.

In some implementations, the system includes prisms or lenses configured and arranged to shift the associated transmission angle by a selected amount.

In some implementations, the light detectors include photodiodes. The photodiodes can have an associated acceptance angle, for example, of at least 4° degrees, of at least +/−10° degrees, or of at least +/−15° degrees.

In some implementations, each of the light detectors is designed to accept light over an angle of at least +/−10° degrees to provide the associated acceptance angle.

In some implementations, the system includes prisms or lenses configured and arranged to shift the associated acceptance angle by a selected amount.

In some implementations, the support frame includes an arc frame arranged around the transport path including the product support.

In some implementations, the system further includes a second light source including a laser, and a second light detector include a camera.

In some implementations, the system further includes a muting sensor and a reflector arranged on opposing sides of the transport path including the product support.

In some implementations, measuring edge locations of the product includes measuring a right edge location of the product, and measuring a left edge location of the product, where measuring the right edge location of the product includes determining second detectors of the multiple light detectors on a right side of the transport path that detect light from second light sources of the multiple light sources on a left side of the transport path, and where measuring the left edge location of the product includes determining second detectors of the multiple light detectors on a left side of the transport path that detect light from second light sources of the multiple light sources on a right side of the transport path.

In some implementations, measuring edge locations of the product further includes, determining, from a lookup table, a subset of the second detectors and a subset of the second light sources based in part on the measured height of the product.

In some implementations, at least one light source of the light-emitting array is arranged on the support frame at a height above the product support that is greater than a height of the product supported by the product support.

Moreover, in some implementations, a non-transitory, computer-readable medium can encode instructions configured to cause the data processing apparatus to perform one or more methods, as detailed above and herein. Moreover, the system can include the computer-controlled manufacturing system.

Particular embodiments of the subject matter described in this specification can be implemented to realize one or more of the following advantages. The light curtain assembly as described can be utilized to detect and measure product curvature, which can expand capabilities for identifying and monitoring a number of differently shaped products, and can enrich the information gathered for products on a conveyor belt or other product support. By implementing vertical emitter/detector arrays according to some embodiments described herein, a product width of a product on the conveyor belt can be measured without requiring placement of emitters or detectors below the conveyor belt (e.g., located between gaps of the conveyor belt). Moreover, the system(s) as described can measure multiple products located on the conveyor belt without requiring a gap/spacing between each expected product, which can yield an increase in product density on the conveyor belt.

The system can include a narrower profile by using vertical light emitters/detectors, and can reduce the need for physical safety barriers, thereby reducing a space requirement along a production line and creating space saving and/or cost-saving results. Utilizing compact laser guarding, valid items can be distinguished from body parts to deactivate a laser without requiring physical reach-in guarding. The system can perform real-time item position measurement which can be used to perform real-time adjustments to print location on products, facilitate validation of product loading. The system can replace other methods and devices utilized for triggering, e.g., photoelectric or inductive sensors, by sending triggers x-milliseconds after detecting a back edge of a product on the line, thereby reducing a number of devices required along the manufacturing line. For products with known shapes or dimensional characteristics, the system can be utilized to monitor real-time belt speed of a conveyor belt.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 3 depicts an example of a system including a light curtain assembly for product height measurement.

FIGS. 4A-4D depict an example of a system including a light curtain assembly for product edge detection and measurement.

FIG. 16 depicts another example of a system including a light curtain assembly.

Like reference numbers and designations in the various drawings indicate like elements.

DETAILED DESCRIPTION

Multiple vertical arrays of wide-angle light emitters and detectors on opposing sides of a region being monitored can be activated selectively to create a grid of both horizontal and angled beams. This complex light grid detects and measures a plurality of edges of a plurality of objects in the monitored region. The measured characteristics can be used to detect the entrance of an expected product, measure its physical location, size, shape, and speed, and to discriminate between the expected product and something unexpected. The entrance of something unexpected can be used, for example, to deactivate hazardous machinery and/or prevent access to the monitored region.

This specification describes technologies relating to using vertical emitter-detector arrays to detect, monitor and measure products on a product support as the products pass through a monitoring area, and to disable hazardous equipment when something unexpected enters the monitoring area.

Figure 1:
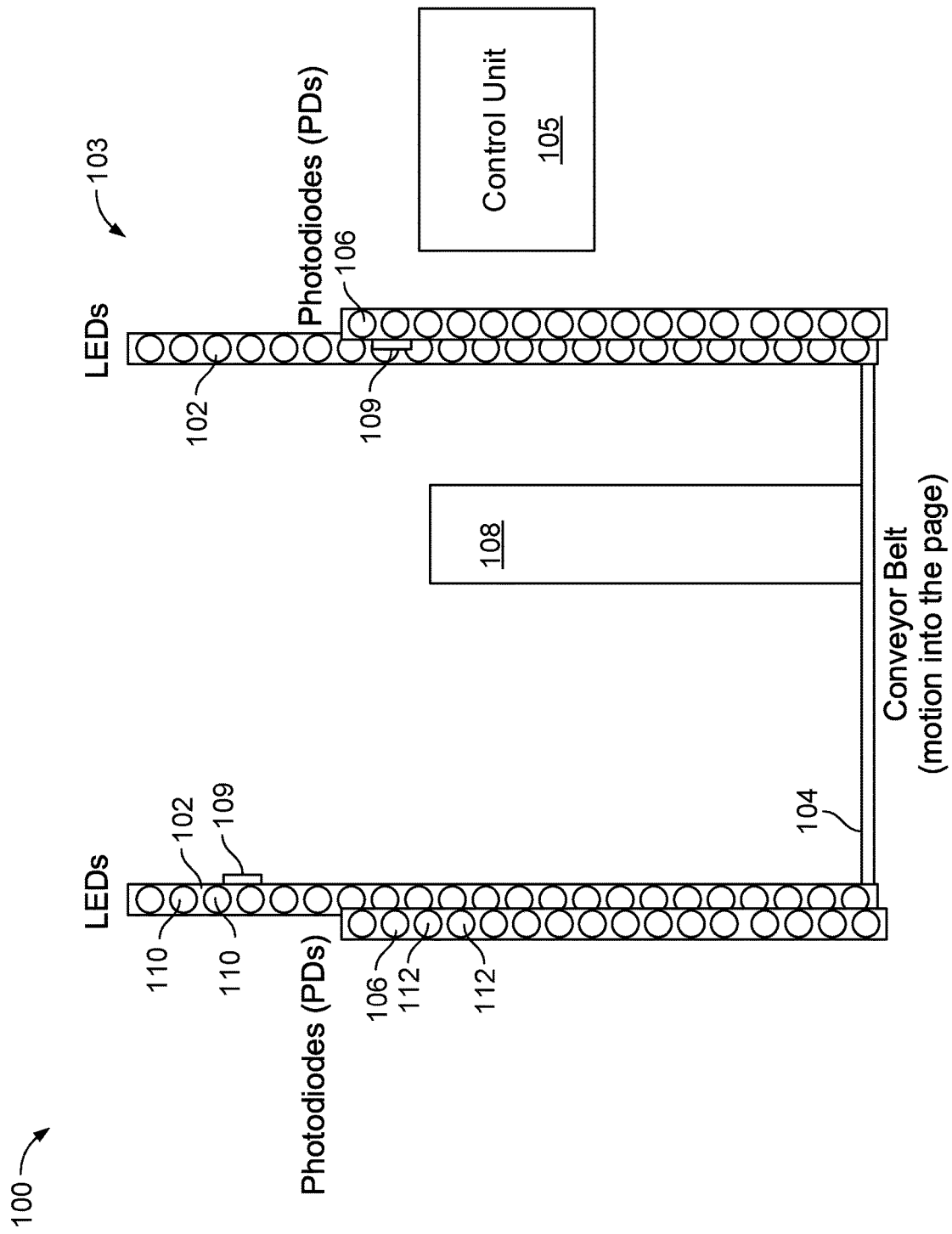
FIG. 1 depicts an example of a system including a light curtain assembly.

In some embodiments, as depicted in FIG. 1, a system 100 can include two light-emitting linear arrays 102 arranged on a support frame 103 on either side of a product transport, e.g., a conveyor belt 104, and two corresponding photodiode (PD) arrays 106 on opposite sides. In some implementations, a product transport can include rails, chutes, or another form of automated or robotic product conveyance system.

The light-emitting linear arrays 102 can extend well above the maximum product height of a product 108. The height of each sequentially-numbered light emitter 110 matches a height of a corresponding PD 112 on an opposing side of the conveyor belt 104.

In some embodiments, the light-emitting linear arrays 102 include 5 mm beam spacing with a 200 mm array height, with 40 light emitting diode (LED)/photodiode (PD) pairs. The system 100 includes scan speed of at least 350 light curtain frames/second (e.g., 14,000 samples/second) with a measurement range of at least 300 mm, and where the sampled data is stored in a circular buffer memory. A control unit 105 including one or more processors is coupled to the light-emitting linear arrays 102, PD arrays 106, and encoder (not shown) for the conveyor belt 104 and is configured to provide operating instructions, capture sampling data, perform measurements, and perform other functions related to the system 100. In some cases, the control unit 105 provides control instructions to each light emitter 110 and captures respective signal/no signal data from each PD 112. The control unit 105 additionally can capture encoder data from the conveyor belt.

In some embodiments, the emitter-detector spacing along the support frame 103 is not regular. A spacing of one emitter-detector pair can be different than a spacing of another emitter-detector pair.

In some embodiments, the PD arrays 106 need extend only the height of a single PD 112 above the maximum product height of the product 108.

The optics for each light emitter 110 can be designed to spread the emitter's light over a relatively broad angle, for example, a spread angle of +/−10 degrees, +/−20 degrees, +/−15 degrees. Similarly, the optics of each photodiode 112 can be designed to accommodate a similar acceptance angle, for example, an acceptance angle of +/−10 degrees, +/−20 degrees, +/−15 degrees. In some cases, a Fresnel prism 109 can be coupled to the photodiode 112, the light emitter 110, or both the photodiode 112 and the light emitter 110, to shift an acceptance angle range of the photodiode 112 and/or the transmission angle, respectively. The Fresnel prism can allow the system to take advantage of the ability to concentrate the projected light beam of the LED (e.g., +/−10°, e.g., +/−15°) to concentrate it down to the angle needed, for example, angled down toward the photo detector over the range of (0) to (−20°).

Figure 2C:
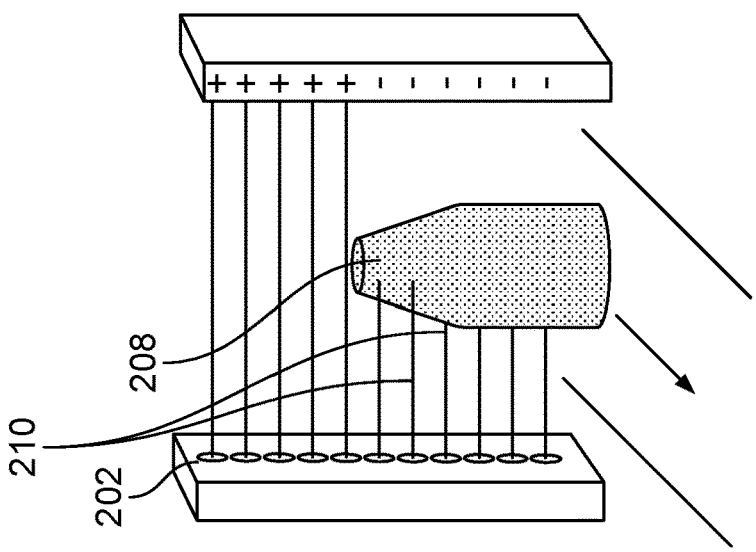
FIGS. 2A-2C depict an example of a product passing through a system including a light curtain assembly.
Figure 2B:
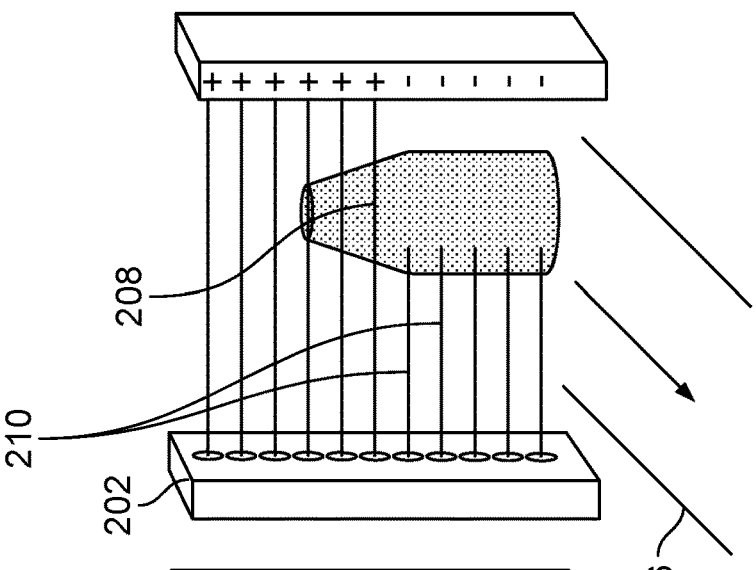
Figure 2A:
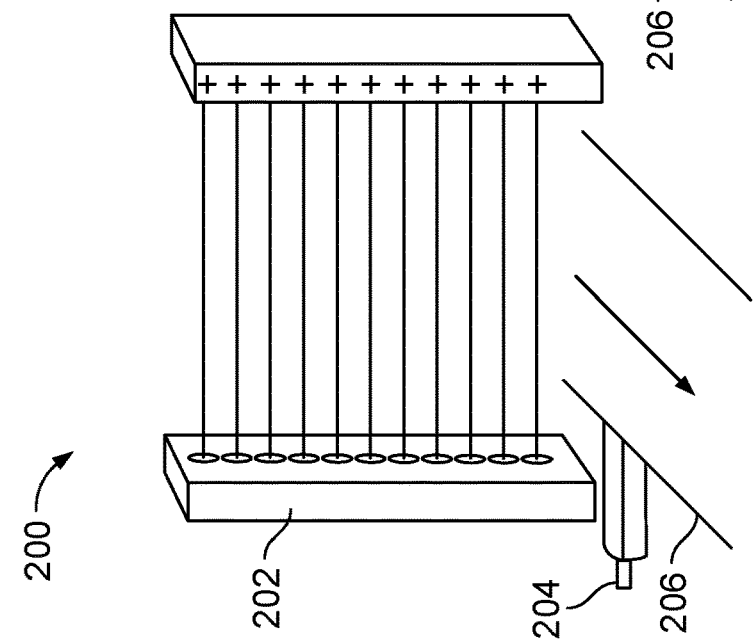

FIGS. 2A-2C depict an example of a product passing through a system including a light curtain assembly. As depicted in FIG. 2A, system 200 includes a light curtain 202 and an encoder 204 (e.g., a belt encoder) coupled to a product support 206 (e.g., a conveyer belt), such that the output of the light curtain (e.g., active/inactive output from the photodetectors) and output from the encoder 204 (e.g., a speed of conveyer belt movement according to the belt encoder) can be utilized to distinguish a product including a height and length from a hand or arm. For example, the system 200 can detect non-contiguous items, e.g., separate fingers of a hand. As depicted in FIG. 2A, light curtain 202 includes a vertical assembly of light emitters that are arranged opposite the product support 206 from a vertical assembly of light detectors. Referring now to FIG. 2B, a product 208 on the product support 206, e.g., a moving conveyer belt, passes between the vertical assembly of light emitters and light detectors, such that one or more of the beams 210 are disrupted by the product 208. As the product continues to pass through the light curtain 202 (e.g., as depicted in FIG. 2C), the number of beams 210 disrupted by the product can change, according to dimensions of the product 208.

As will be described in further detail below, the system can first determine a product height using a horizontal beam scan using light emitters on a single side, then use angled scans (directed downward) to measure lateral positions of the left and right corners at the top of the product. The system can couple the measurements with belt encoder data (indicating how much the product has traveled) and the edge positions to measure product position, product length and width, and top edge curvature.

In some embodiments, product characteristics are well known, for example, in a food packaging line where the dimensions of a product package are well known and tightly controlled. In instances in which product dimensions are well known, the system can compare measured dimensions and/or aspect ratio against known dimensions and/or aspect ratio to deduce belt speed of a conveyer belt. The system can also perform product analysis, for example, if the package dimensions do not match what's expected, the system can detect that the wrong package has been loaded by mistake (e.g., a 330 milliliter can loaded when a 500 milliliter can was expected). In another example, the system can detect a foreign object, e.g., a person's hand, and deactivate the hazardous machinery.

In some embodiments, the system can distinguish between a product and a non-product based on an entrance location (e.g., an entering object is not resting on the conveyer belt/product support), an object size (e.g., object height and/or object depth or width in the direction of belt movement), contiguity of the object (e.g., if open-handed fingers enter), or a combination thereof.

As described, an outer shape of a product can be validated, for example, a circular product's outer shape and/or diameter, an outer shape of a bottle, an outer shape of a rectangular box, an outer shape of a bag, etc.

FIG. 3 depicts an example of a system 300 including a light curtain assembly 302 for product height measurement. As depicted in FIG. 3, a light-emitting array 304 includes multiple light emitting diodes (LEDS) 306, e.g., 22 LEDS, arranged along a vertical support frame 308. A photodiode array 310 includes multiple photodiodes (PDs) 312, e.g., 16 PDs, arranged along the vertical support frame 308. In the example depicted in FIG. 3, the light-emitting array 304 includes a greater number of LEDs 306 than a number of PDs 312. Each LED 306 is arranged on the vertical support frame 308 opposite a conveyer belt 314 of a PD 312, e.g., LED-01 through LED-16 is each across the conveyer belt 314 from a respective PD-01 through PD-16. LED-17 through LED-22 do not have a matching PD located across the conveyer belt. In some embodiments, LEDs 306 can have a respective transmission angle 316, e.g., 4 degrees, e.g., ±15 degrees. Photodiodes 312 can have a respective acceptance angle 318, e.g., ±15 degrees.

A product height measurement can be performed by initiating a scan of sequential emission of each LED 306 from the light-emitting array 304 and determining if a signal is detected at a corresponding PD 312 opposite the conveyer belt 314 from the LED 306. In some embodiments, the scan is initiated with an LED 306 and corresponding PD 312 that are closest to the conveyer belt 314, e.g., LED-01 and PD-01. In some cases, LED-01 emits a light signal ("on") and PD-01 detects "signal" or "no signal" in response. Each successive LED/PD pair are scanned (e.g., LED-02/PD-02, LED-03/PD-03 . . . LED-13/PD-13), until an LED/PD pair is scanned where a light signal is detected, e.g., LED-14 emits a light signal and PD-14 detects "signal." The system can determine, based on this detected signal at PD-14, that a product height of product 320 is less than a height of the LED-14/PD-14 pair arranged on the support frame 308.

Once the system has determined an LED/PD pair corresponding to a product height for product 320, the system can perform product edge detection and measurement. FIGS.

4A-4D depict an example of a system 300 including a light curtain assembly 302 for product edge detection and measurement. As described with reference to FIG. 3, a product height for product 320 is determined to correspond to LED/PD pair LED-14/PD-14 of the light curtain assembly 302. As depicted in FIG. 4A, "upper" LEDs 402 and "upper" PDs 406 are those above the product height and "lower" LEDs 404 and "lower" PDs 408 indicate those below.

In some embodiments, performing product edge detection and measurement includes starting at the first LED above the product height, (e.g., LED-15) and scanning Upper Left LEDs 402 and Lower Right PDs 408 to measure a location of a right edge 410 of product 320. In a first step, a single Upper Left LED, e.g., LED-16, is turned on while individual Lower Right PDs are sampled from bottom up until light is detected, e.g., PD-09, PD-10, PD-11, PD-12 successively, indicating the ray angle detecting the lateral position of the product's right edge.

Figure 4B:
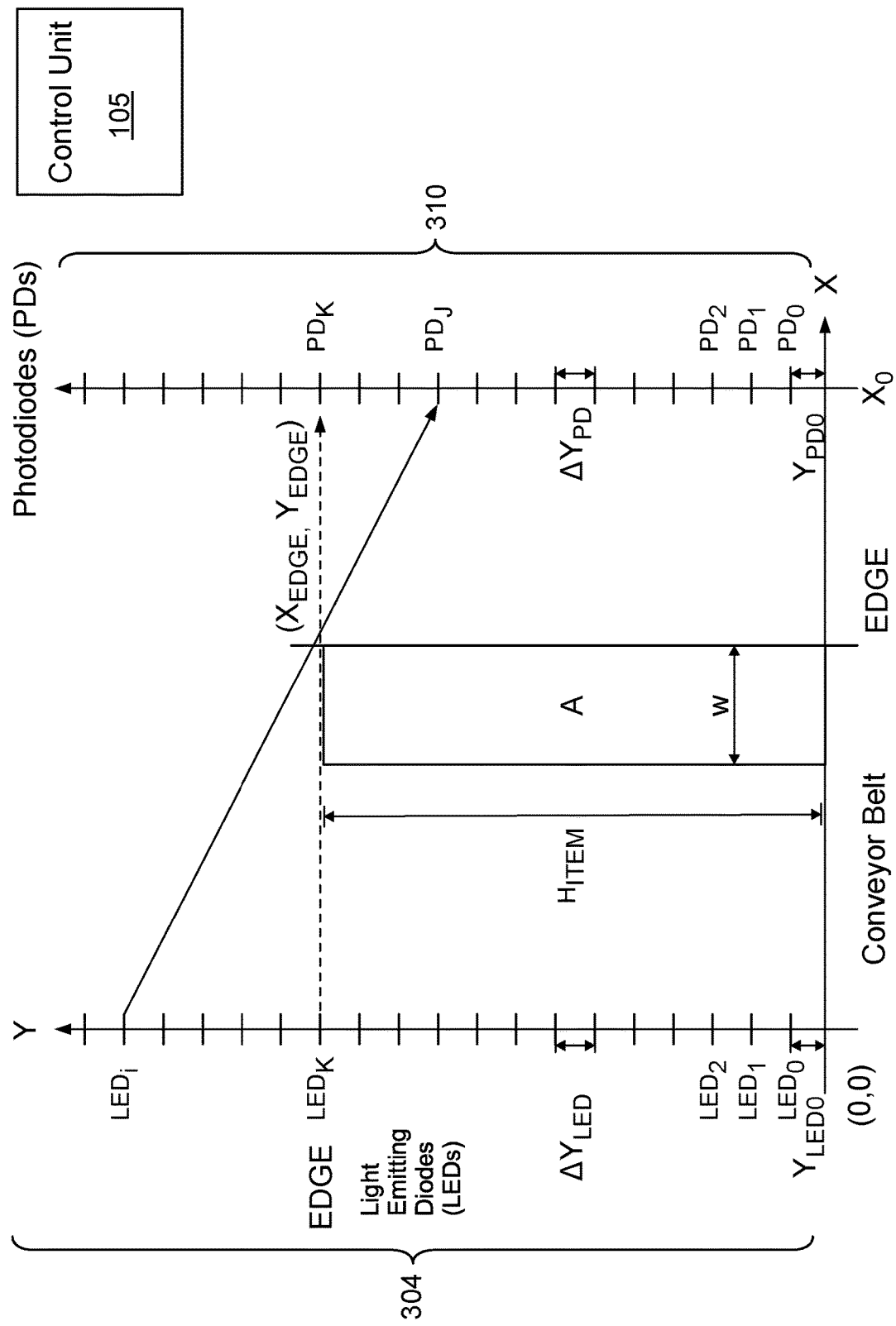

Referring now to FIG. 4B, Light-Emitting Diodes (LEDs) are placed along the vertical Y axis with an offset above the conveyor belt of $Y_{LED0}$ and regular spacing $\Delta Y_{LED}$. The horizontal X axis is defined as across the width of the conveyor belt, with the LEDs intersecting with the X-axis origin. Photodiodes (PDs) are placed along a vertical line intersecting with the X-axis at position $X_O$, with an offset above the conveyor belt of $Y_{PD0}$ and regular spacing $\Delta Y_{PD}$.

An item A to be measured rests on the conveyor belt between the LEDs and PDs with characteristic height $H_{ITEM}$ and width $W_{ITEM}$, with its top corner edge to be measured furthest from the LEDs at position ($X_{EDGE}$, $Y_{EDGE}$).

As depicted in FIG. 4B, the LED-to-PD lines can be arranged horizontally, such that the initial item height measurement:

$$\Delta Y_{LED} = \Delta Y_{PD} = \Delta Y, \text{ and } Y_{LED0} = Y_{PD0} = Y_0. \tag{1}$$

This translates to identical LED/PD spacing and offsets above the belt. The (x,y) coordinate for each $LED_i$ is:

$$X_{LED-i} = 0, Y_{LED-i} = Y_0 + i\Delta Y. \tag{2}$$

The (x,y) coordinate for $PD_J$ is:

$$X_{PD-J} = X_O, Y_{PD-J} = Y_0 + K\Delta Y. \tag{3}$$

The equation defining the path of a horizontal light ray emanating from $LED_K$ to $PD_K$, which has zero slope and fixed height is given by:

$$Y_{LED-K} = Y_{PD-K} = Y_0 + K\Delta Y \tag{4}$$

To locate the X-position of the item's edge ($X_{EDGE}$), the line slope and intercept defining the path of the downward-looking light ray emanating from $LED_i$ to $PD_J$, where i>j, is given by:

$$\text{SLOPE} = \left(\frac{\Delta Y}{\Delta X}\right) = \frac{(j-i) * \Delta Y}{Xo} \tag{5}$$

$$\text{INTERCEPT} = Y_0 + i\Delta Y \tag{6}$$

Figure 4C:
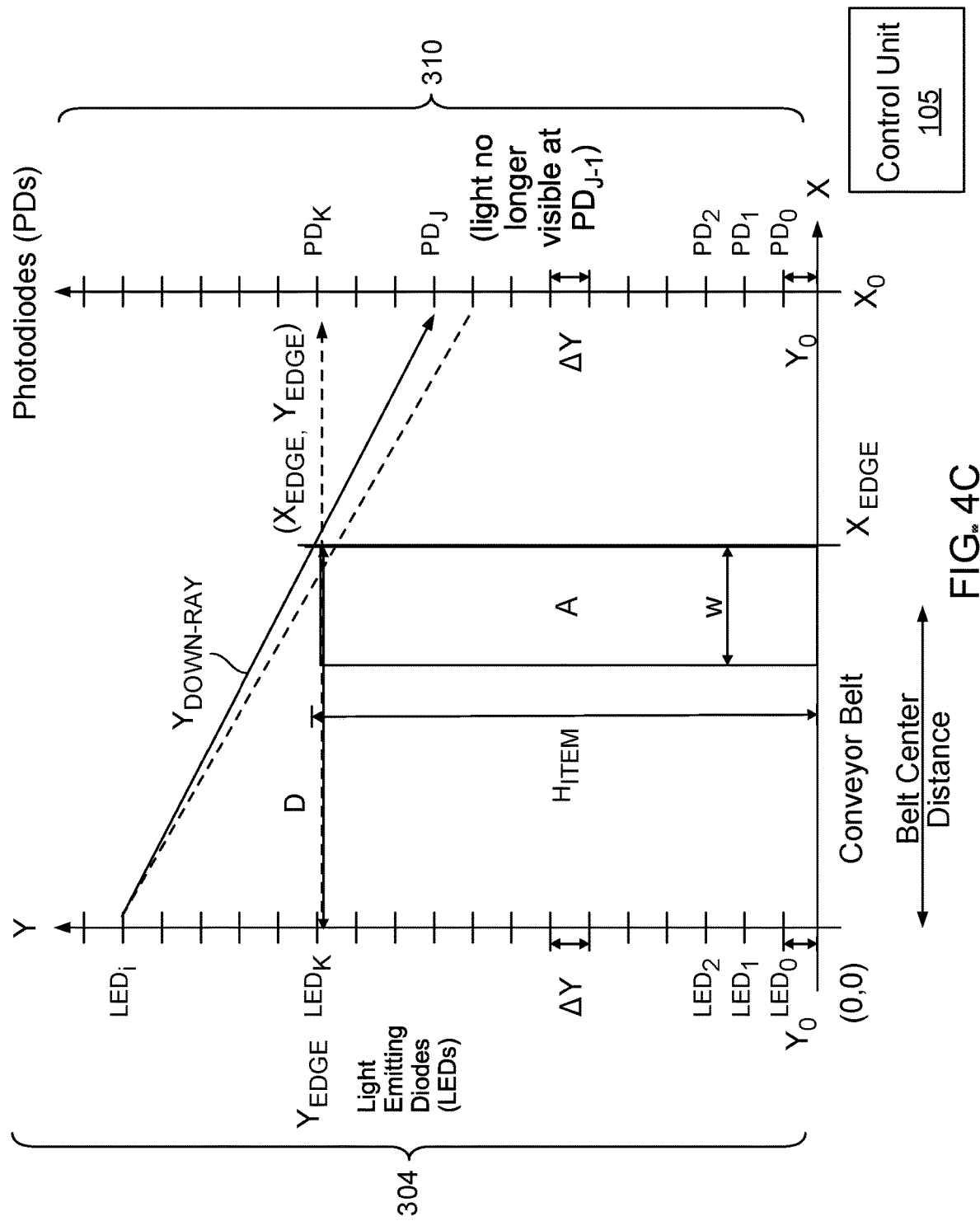

Referring to FIG. 4C, let K equal the index of the lowest horizontal light ray defined by $LED_K$ and $PD_K$ where light passes over the item. From equation 4, $$Y_{EDGE} = H_{ITEM} = Y_0 K \Delta Y \tag{7}$$

Next, an $LED_i$ higher than $LED_K$ (i>K) is turned on. Starting at $PD_i$ of the same height, lower PDs are selected successively one at a time until the light from $LED_i$ is no longer visible.

Let J equal the index of the lowest downward-pointing light ray defined by $LED_i$ and $PD_J$ where light passes over the item's edge. From equations 5 and 6, $$Y_{DOWN-RAY} = X\left(\frac{(j-i) * \Delta Y}{Xo}\right) + Y_0 + i\Delta Y \tag{8}$$

The horizontal and down-pointing rays intersect where $$Y_{DOWN-RAY} = Y_{EDGE} \tag{9}$$

With reference to FIG. 4C, at the intersection the X and Y coordinates for the rays $Y_{DOWN-RAY}$ and $Y_{EDGE}$ are the same, e.g., $X = X_{EDGE}$ and $Y = Y_{EDGE}$.

Substituting equation 8 in equation 9 to solve for $X_{EDGE}$, yields:

$$\left(\frac{(j-1) * \Delta Y}{Xo}\right) * X_{EDGE} + (Y_0 + i\Delta Y) = Y_0 + K\Delta Y \tag{10}$$

$$\left(\frac{(j-1) * \Delta Y}{Xo}\right) * X_{EDGE} + i\Delta Y = K\Delta Y \tag{11}$$

$$\left(\frac{(j-1)}{Xo}\right) * X_{EDGE} + i = K \tag{12}$$

$$\left(\frac{(j-1)}{Xo}\right) * X_{EDGE} = K - i \tag{13}$$

$$X_{EDGE} = Xo\left(\frac{(K-i)}{(j-i)}\right) \tag{14}$$

In some embodiments, when detecting a lateral position of the product edge ($X_{EDGE}$, $Y_{EDGE}$), it may be desirable to limit the transmission angle of the LED light. For example, an LED can experience loss of intensity when far off axis. Moreover, for a transmission angle too close to 0 or 90 degrees, the system may not be able to see the edge of the product. Thus, it may be desirable to limit the maximum LED transmission angle used for corner detection, e.g., a transmission angle between 25°-35°.

Figure 4D:
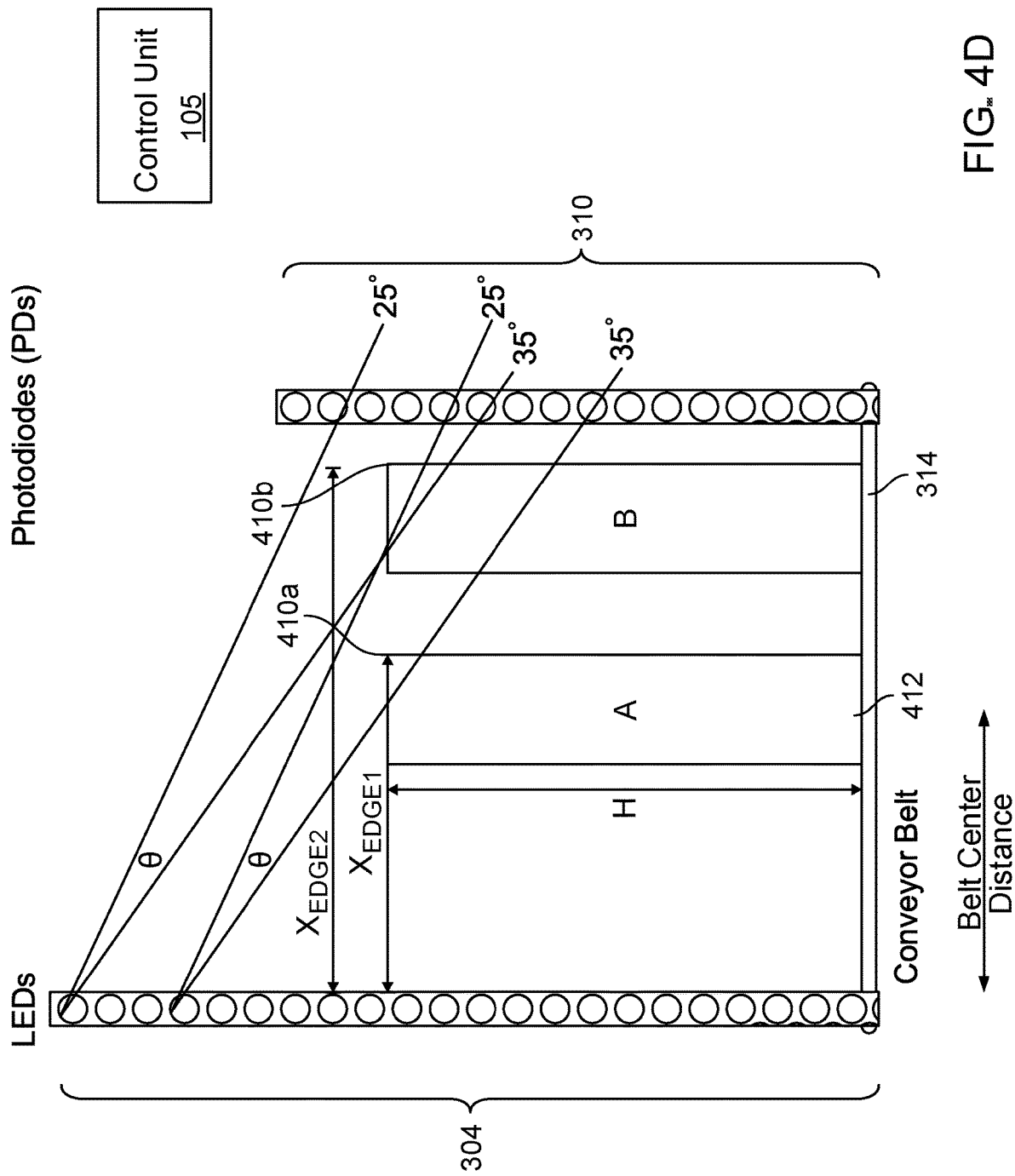

Additionally, in order to measure a product edge of the product A, the light-emitting array 304 should be higher than the tallest product to be measured, depending on belt width, e.g., twice the belt center distance marked in FIGS. 4C and 4D, and furthest possible item offset from centerline, and the (PD) array 310 need only be as high as the tallest product to be measured plus the height of one or two additional PDs. FIG. 4D depicts transmission angles θ for LEDs along the light-emitting array 304, and respective abilities of each LED to measure product edges 410a and 410b, e.g., the coordinates ($X_{EDGE}$, $Y_{EDGE}$), for products A and B depending on a location of product A and product B with respect to a centerline 412 on the conveyor belt 314.

The LEDs having a nonzero transmission angle 316 and the photodiodes having a nonzero acceptance angle 318 have the effect of introducing a range for the possible slopes of $Y_{DOWN-RAY}$, which yields a range of possible values for the measured $X_{EDGE}$. Therefore, knowing and limiting the ranges of the transmission angle 316 and acceptance angle 318 is important in determining the edge heights of items.

Figure 5:
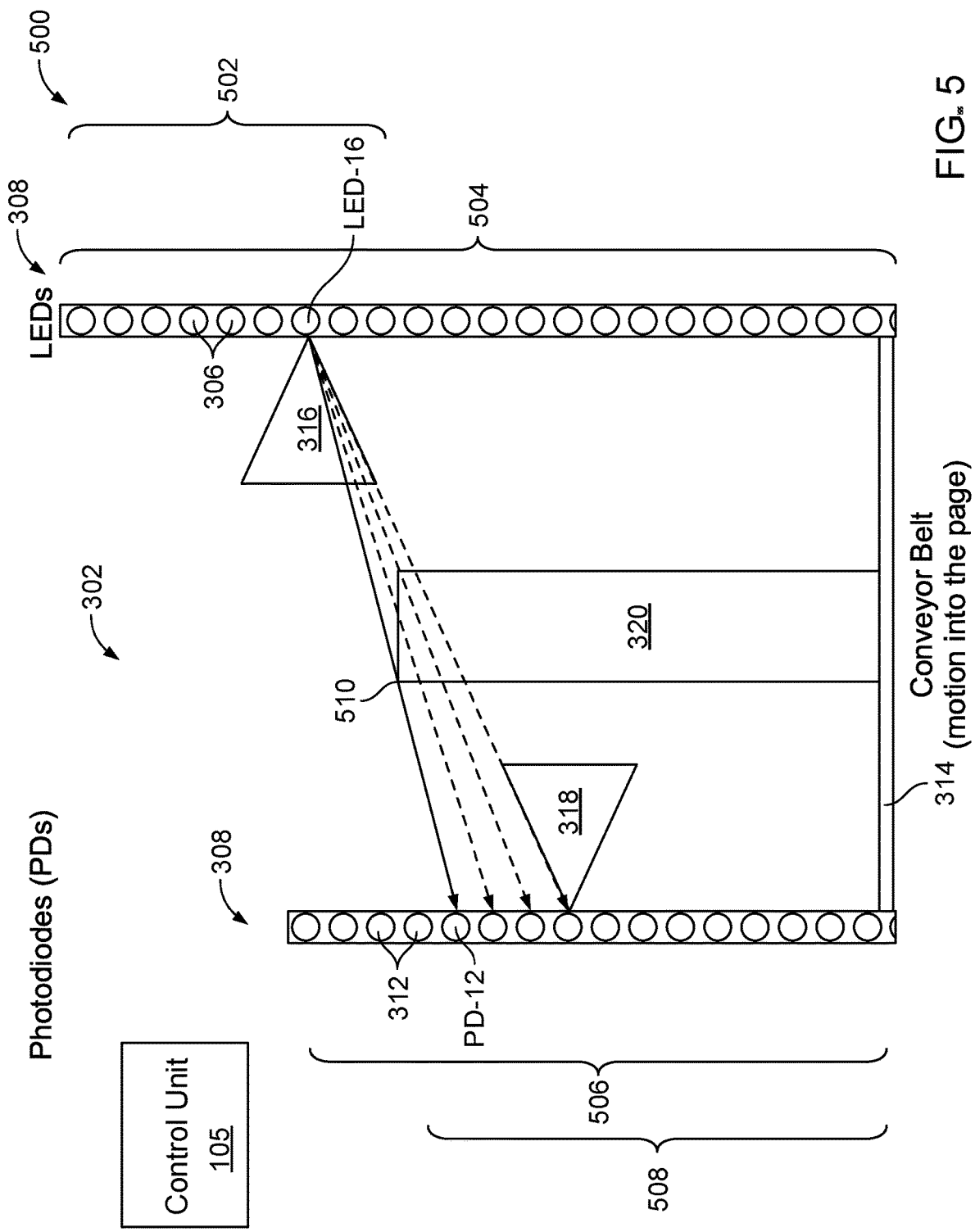
FIG. 5 depicts an example of a system including a light curtain assembly for product edge detection and measurement.

FIG. 5 depicts an example of a system 500 including a light curtain assembly for product edge detection and measurement. Product 320 would have motion into the page along conveyor belt 314. Similar to FIG. 4A depicting the process for measuring a location right edge 410 of product 320, FIG. 5 depicts measurement and detection of a left edge 510 of product 320 utilizing light emitting array 504 and photodiode array 506. Light emitting array 504 and photodiode array 506 are on opposing sides of the conveyer belt 314 of the light curtain assembly 302.

As described with reference to FIG. 3, a product height for product 320 is determined to correspond to LED/PD pair LED-14/PD-14 of the light curtain assembly 302. As depicted in FIG. 5, "upper" LEDs 502 are those above the product height and "lower" PDs 508 indicate those below.

In some embodiments, performing product edge detection and measurement includes starting at the first LED above the product height, (e.g., LED-15) and scanning Upper Right LEDs 502 and Lower Left PDs 508 to measure a location of a left edge 510 of product 320. In a first step, a single Upper Right LED 502, e.g., LED-16, is turned on while individual Lower Left PDs 508 are sampled from bottom up until light is detected, e.g., PD-09, PD-10, PD-11, PD-12 successively, indicating the ray angle detecting the lateral position of the product's left edge.

Figure 6:
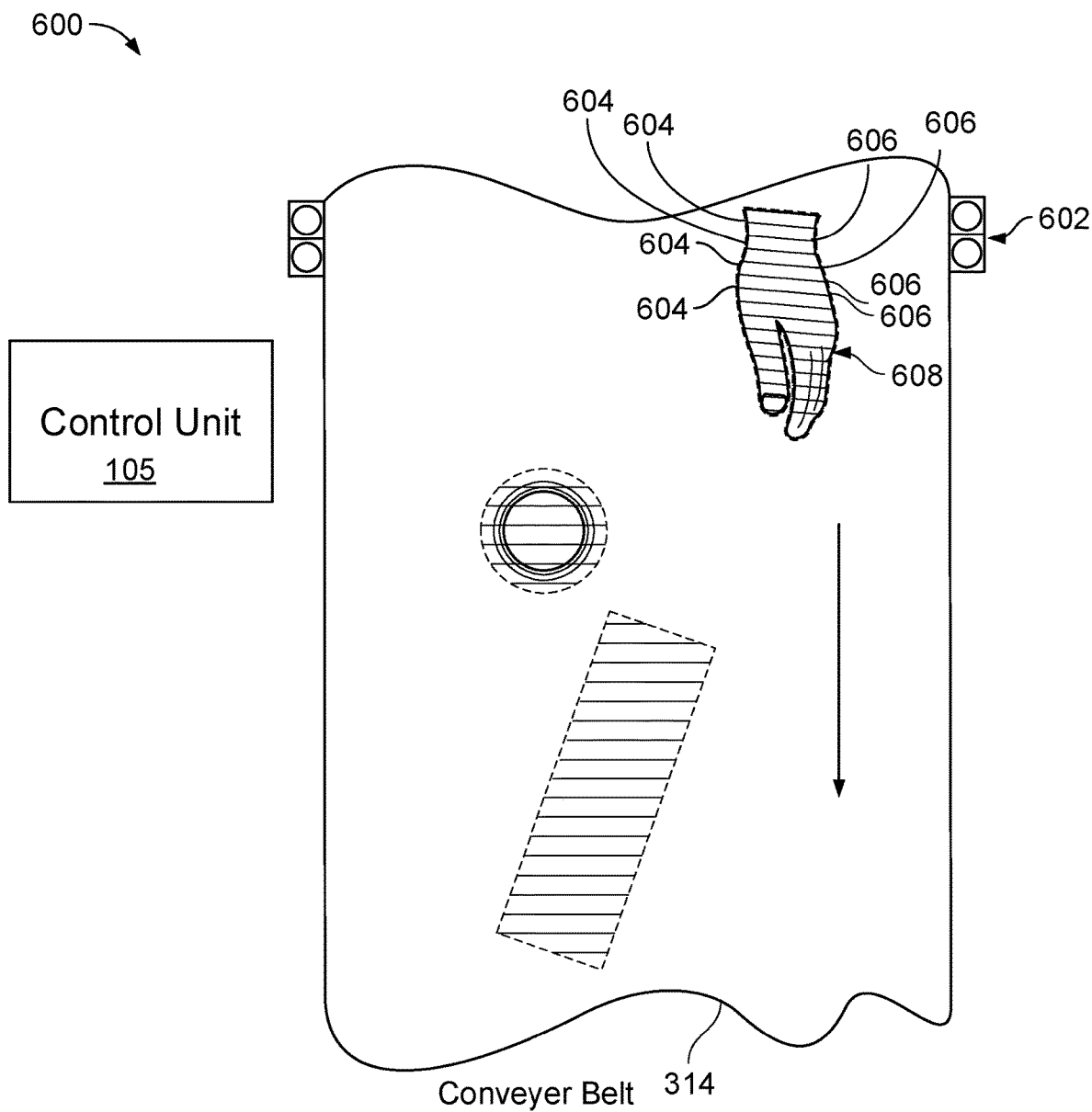
FIG. 6 depicts an example of a system including a light curtain assembly for product contour detection and measurement.

FIG. 6 depicts an example of a system 600 including a light curtain assembly 602 for product contour detection and measurement. Successive scans of the left edges 604 and right edges 606 along a top of an object 608 can be used to measure object characteristics, such as length, width, shape, and the curvature of a top edge of the object 608, and thus determine if the object 608 is a product that should be there, or an object that shouldn't be there, such as the hand shown in this example.

In some embodiments, successive measurements of the left edges and right edges of a product can be compared with known product dimensions to precisely deduce conveyor belt speed. In some embodiments, product measurements can be used to validate the correct package has been loaded. For example, if an item that is clearly not an expected product-such as a hand—enters the monitoring area, the system can provide an alert, stop further motion of the product support, disable hazardous energy (e.g., disable a laser, robot, thermal devices, any motion hazards, etc.), or a combination thereof.

Figure 7:
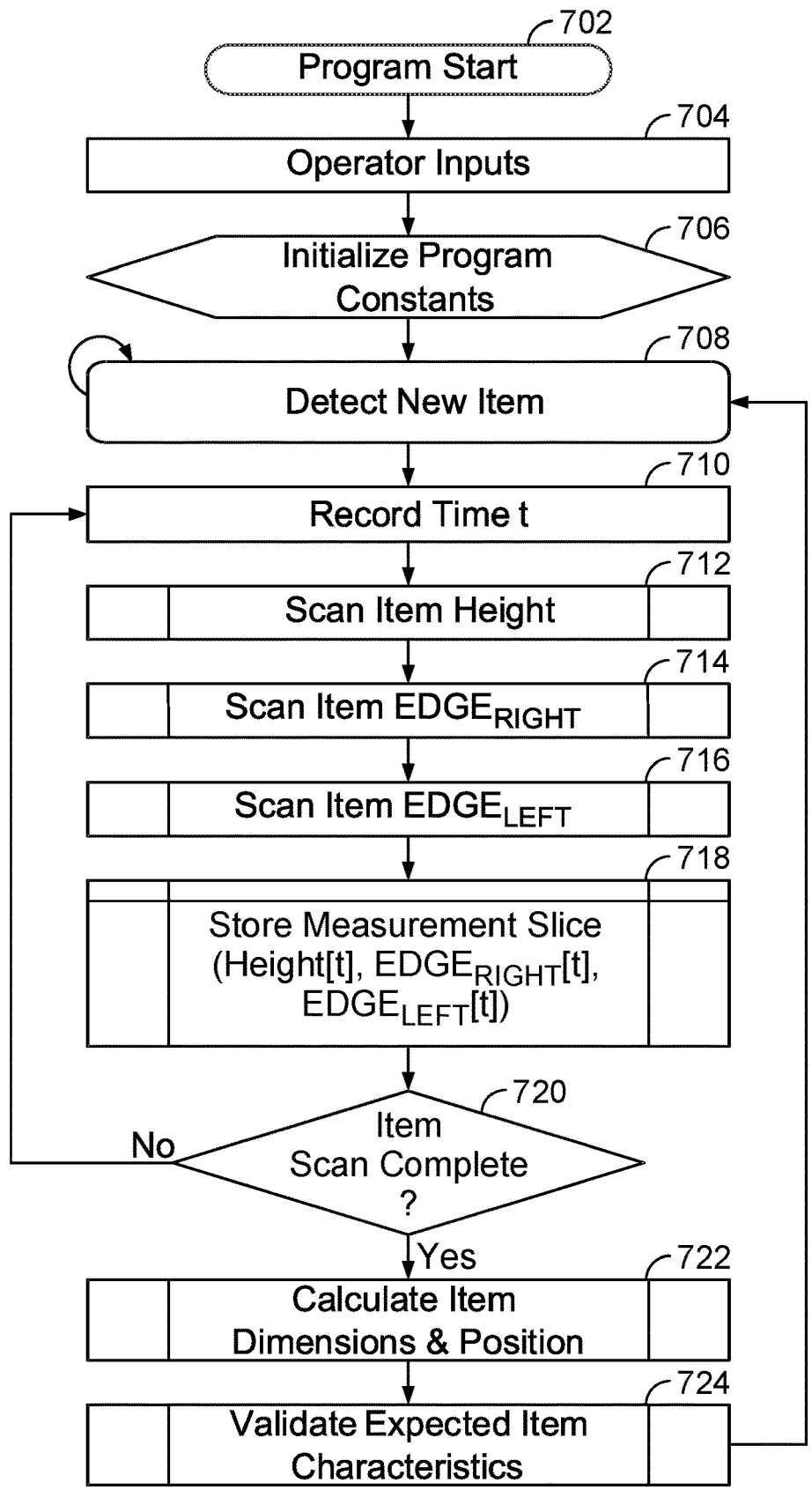
FIG. 7 is a flow diagram of an example of a process of a system including a light curtain assembly.

FIG. 7 is a flow diagram of an example process 700 of a system including a light curtain assembly. In step 702, the top-level program starts.

In step 704, the system receives operator inputs. The first time the program is run, the operator may be prompted to enter Belt Width ($X_O$ as depicted, e.g., in FIGS. 4B, 4C), the expected item Shape (cylindrical or rectangular) of an item (e.g., product 320, item A), and the item's nominal Height and Height Tolerance. If the expected items are cylindrical, the operator further enters their expected Diameter and Diameter Tolerance. If the expected items are rectangular, the operator enters their expected Length, Length Tolerance, Width, and Width Tolerance. After this initial data entry, these values may be stored and retrieved from non-volatile memory.

In step 706, the systems initializes program constants. Constants set at the factory can include, for example, $MAX_{LEDS}$ (the total number of LEDs in the system), the number of LEDs per side, $MAX_{PDS}$ (the total number of PDs in the system), the number of photodiodes per side, the LED/PD vertical spacing, and the negative and positive Photodiode optical acceptance angle range (e.g., 0 to +40 degrees). From the PD acceptance angle, belt width $X_O$, and LED/PD spacing, the system can determine MAXDELTA, i.e., the largest difference between the LED and PD indices (that is, the largest vertical distance between them on opposite sides of the conveyor belt) where it will be possible for a PD to see an LED if no object is present on the belt.

Figure 15:
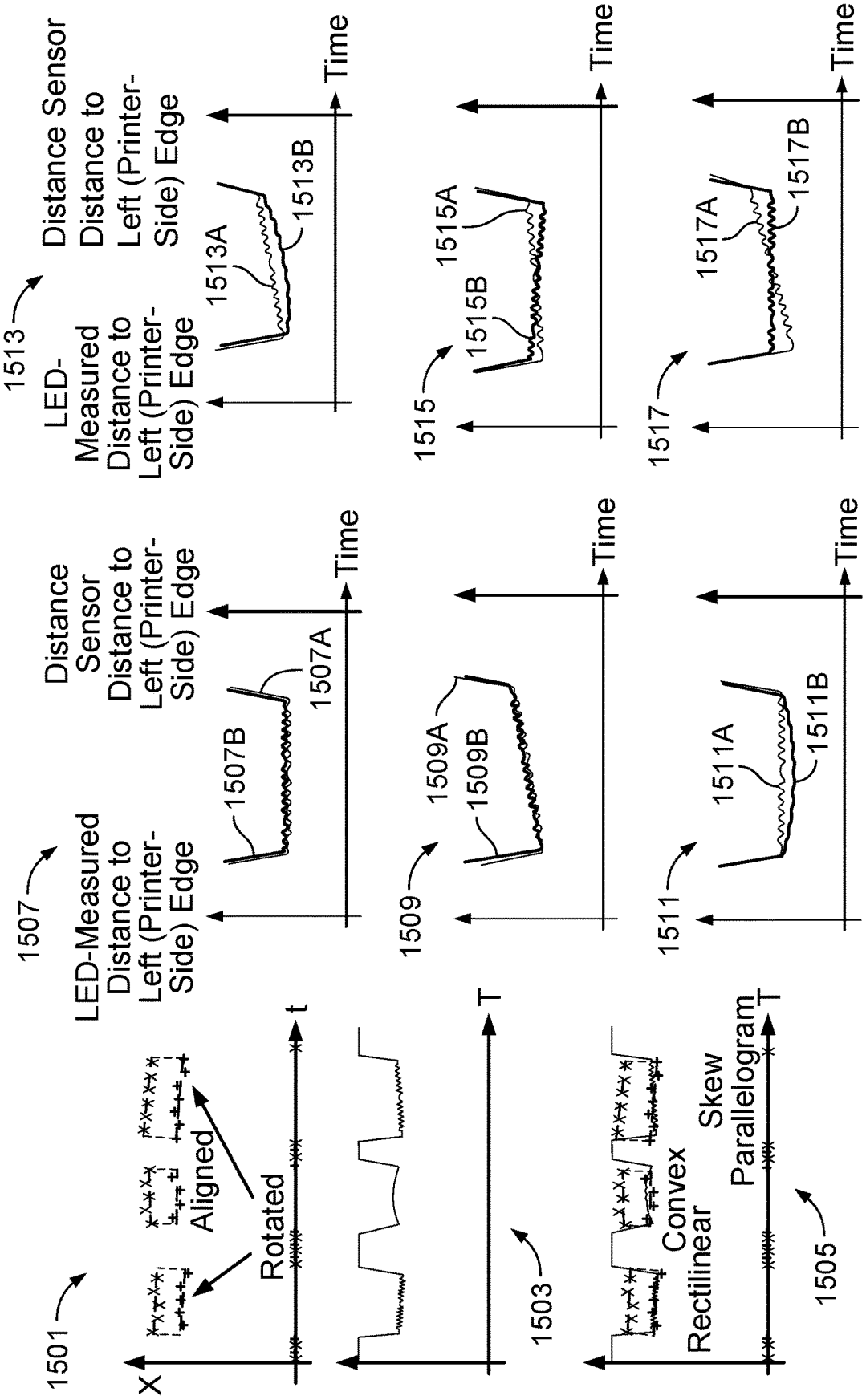
FIGS. 15A-C depict examples of measurement data for a system including a light curtain assembly and distance measure sensor.

In step 708, the system detects a new item on the conveyer belt. The item (e.g., product 320, product A) can be detected on the conveyer belt 314, for example, when a muting sensor is triggered (e.g., as depicted in FIG. 15A). Detection of a new item on the conveyer belt can be performed by an optical or mechanical trigger located along the conveyer belt 314. In some embodiments, the light-emitting array 304 and PD array 310 can be utilized as an optical trigger to detect the new item on the conveyer belt 314.

In step 710, the system records the current system time from a real-time clock, e.g., a clock function of the control unit 105. Subsequent item height and left/right edge position measurements can be associated with their measurement time so they can be fitted to the appropriate rectangular or circular shape with a minimum least-squared error.

Figure 8:
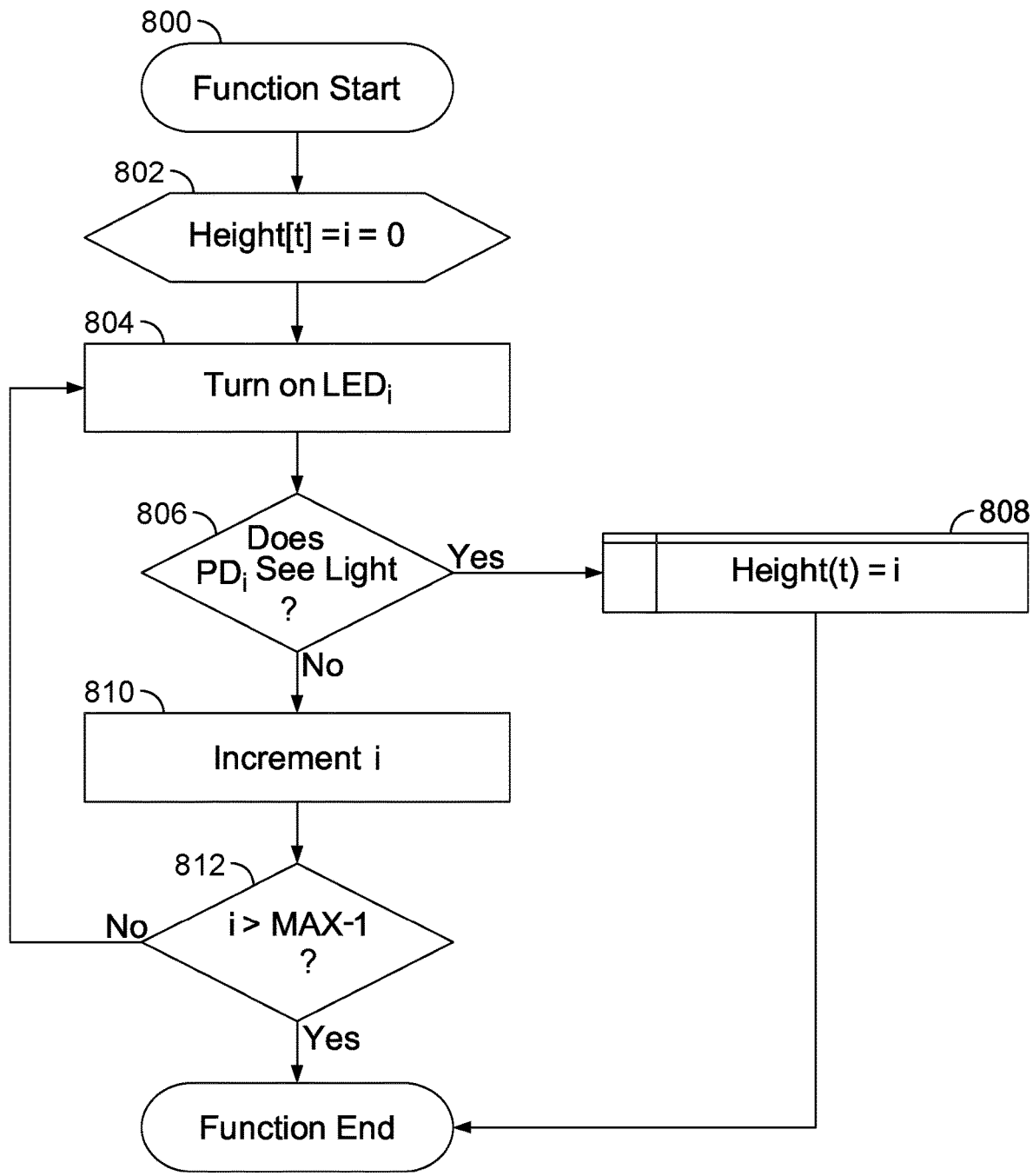
FIG. 8 is a flow diagram of another example of a process of a system including a light curtain assembly.

In step 712, the system scans a height of the item. As described in FIG. 3, the system 300 sequentially emits light signal from LEDs 306 in the light-emitting array 304, starting with an LED (e.g., LED-01) located close (or closest) to the conveyor belt 314 and determining if a light signal is received at a corresponding PD 312 of the PD array 310, (e.g., PD-01). The system will sequentially check each LED/PD pair moving vertically up the support frame 308, e.g., LED-02/PD-02, LED-03/PD-03 . . . LED-N/PD-N) until a signal is detected at a particular PD. FIG. 8 details the item height scan function in flowchart form.

Based on the scan of the height of the item, the system determines an item height measurement. As depicted in FIG. 3, based on a known configuration of the LEDs 306 and PDs 312 on the support frame 308, the system 300 can determine a product height of the product 320. The system can determine that the product height is less than the height of the LED/PD pair on the support frame 308 where signal is detected, and the product height is greater than the height of the LED/PD pair on the support frame 308 where signal is not detected and that is located adjacent to the LED/PD pair where signal is detected. For example, the product height is less than a height of LED-14/PD-14 (light signal detected) and greater than a height of LED-13/PD-13 (light signal not detected). Respective locations of the LEDs and PDs in the light curtain assembly 302 can be set at a time of assembly and stored by the system 300.

Based on the determined height, the system determines LEDs/PDs to utilize for corner detection, e.g., based on a lookup table. As described with reference to FIGS. 4B-4D, a lookup table can be generated for the system that designates LEDs/PDs to utilize to perform corner detection based on a height of the product, known locations of the LEDs/PDs along the support frame, and transmission angle 316 and acceptance angle 318 of the respective LEDs and PDs.

In step 714, the system scans a right edge of the item. In some embodiments, as described with reference to FIG. 4A, scanning a right edge 410 includes starting at the highest LED on the left side, (e.g., LED-22) and scanning Upper Left LEDs 402 and Lower Right PDs 408 to measure a location of a right edge 410 of product 320. In a first step, a single Upper Left LED, e.g., LED-22, is turned on while individual Lower Right PDs are sampled from top down until light is no longer detected, e.g., PD-16, PD-15, PD-14, PD-13 successively, indicating the ray angle detecting the lateral position of the product's right edge. The system can utilize the designated LEDs/PDs identified in the lookup table based on the product height to select the LEDs/PDs to scan the right edge of the item. In some embodiments, a right edge scan can be performed as described with reference to FIGS. 4B, and 4C, where FIG. 9 details the right edge scan function in flowchart form in further detail.

Based on the scan of the edge of the item, the system determines a right edge position of the item. In some embodiments, as described with reference to FIG. 4B, the system can determine, from the LED/PD pair resulting in a detected signal at the PD, a location of the product right edge 410.

The system can name the determined right edge position of the item EDGE$_{RIGHT}$. The system can name an array of the determined right edge positions of the item(s) as EDGE$_{RIGHT}$[ ]. The same naming convention can apply to left measurements.

In step 716, the system scans a left edge of the item. Similarly, as described with step 714, the process for scanning the left edge of the item is the mirror image of scanning the right edge, swapping right for left LEDs and left for right PDs. The system can maintain separate EDGE$_{RIGHT}$[ ] and EDGE$_{LEFT}$[ ] arrays, which are treated differently by a subsequent shape fitting function.

Based on the scan for the left edge, the system determines a left edge position of the item. As described with reference to FIG. 4B, the system can determine, from the LED/PD pair resulting in a detected signal at the PD, a location of the product right edge 510.

In step 718, the system stores a measurement slice including the height of the item, the right edge position of the item, and the left edge position of the item. The system can store the measurement slice at a local or remote server.

In step 720, the system determines if the item scan is complete. In response to the system determining that the item scan is incomplete, the system will complete steps 704-718 again. A scan can be considered complete based on two methods, (1) a known break in the object is detected or (2) a measured distance of the item's conveyance from the starting edge of the scan has been measured indicating the object has been scanned completely. A stored image can be used to compare an object also, and an encoder or other tracking sensor can be used to determine where the object is and how far it has moved to determine if the scan is complete. In response to the system determining that the item scan is complete, the system will perform step 722 and calculate item dimensions, item position, and item perimeter.

Figure 12:
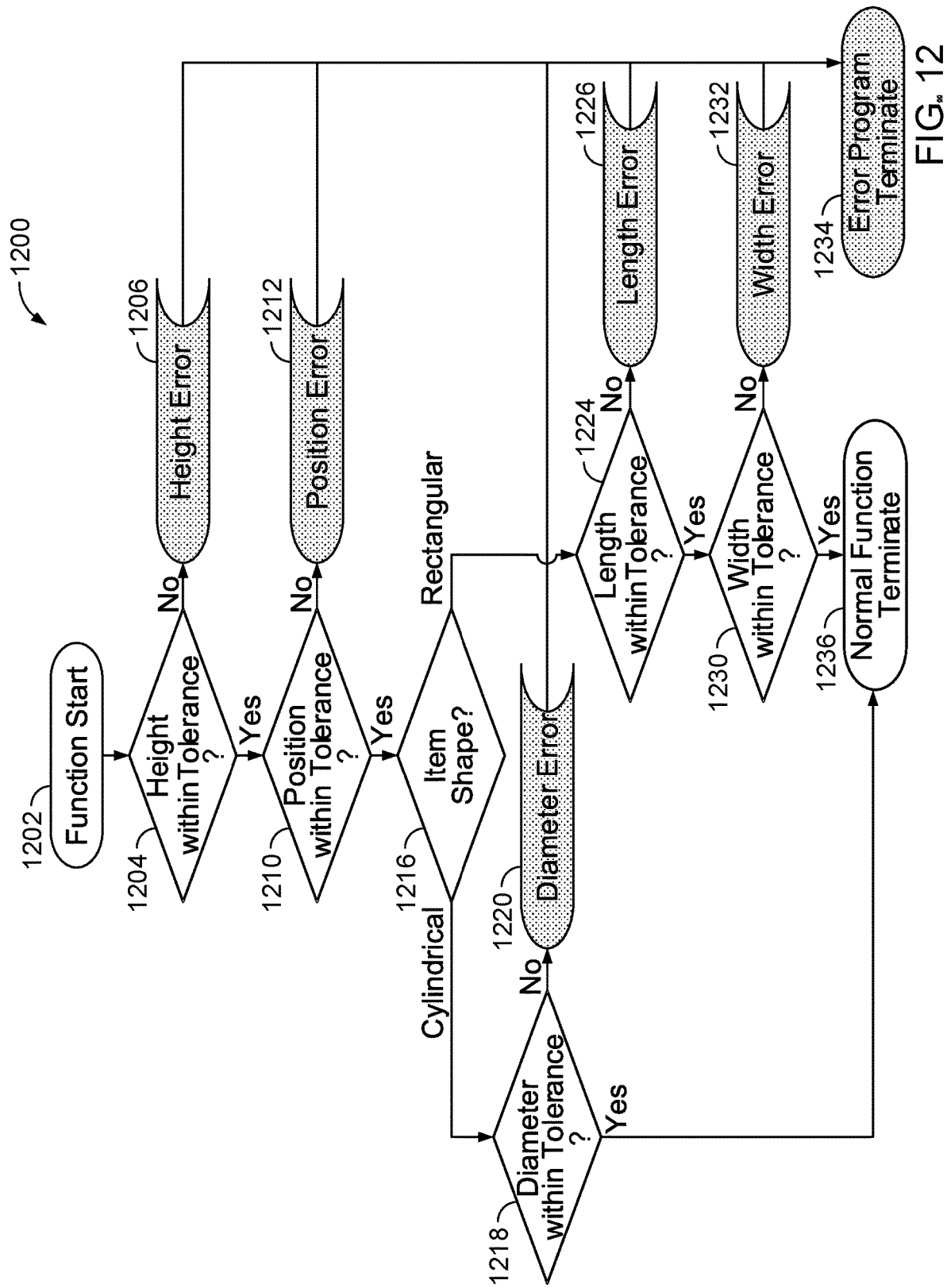
FIG. 12 is a flow diagram of another example of a process of a system including a light curtain assembly.

In step 724, the system validates the measured item characteristics, e.g., dimensions, and position, against expected item characteristics. In some embodiments, in order to validate the measured item characteristics, each linear dimension is determined to be within the operator's specified nominal dimension and tolerance or an error is declared. FIG. 12 depicts a flowchart for the validation function. The system can compare measured dimensions in the stored measured slice against known dimensions (also stored at the system) for the item in question.

In some embodiments, validating the calculated item characteristics against expected item characteristics includes, determining if the calculated item characteristics are indicative of a wrong height, item not on belt (e.g., discontinuous item), edge in a wrong position laterally, wrong shape/profile, wrong width, wrong length, etc. The item characteristics can be validated for one or both sides (e.g., right and left edges), depending on the comparison performed.

At the conclusion of step 724, the system will return to step 702 to detect a new item.

The system can sequentially perform measurements of an item, e.g., calculate Height[t], the edge heights as a function of time FIG. 8 is a flow diagram of an example of a process for performing an item height scan function in flowchart form. As described with reference to FIG. 4B, FIG. 8 details the item height scan function in flowchart form according to some embodiments. The system initializes the start of the process 800. At step 802, the system initializes an index Height[t]=i=0. At step 804, the system turns on an LED at an index height equal to i (LED$_i$) of the multiple LEDs in the LED array. In step 806, the system determines if the photodetector at the index height equal to i (PD$_i$) detects the light from the LED$_i$. In response to determining that the PD$_i$ detects the light from LED$_i$, in step 808 the system records the Height[t] as equal to the height determined by index i and terminates the process. In response to determining that the PD$_i$ does not detect the light from LED$_i$, the system in step 810 will increment i (assuming that the value of i is determined to be less than a MAX-1 value of the total number of LEDs of the system in step 812) and iterate the processes of 804-810.

Figure 9:
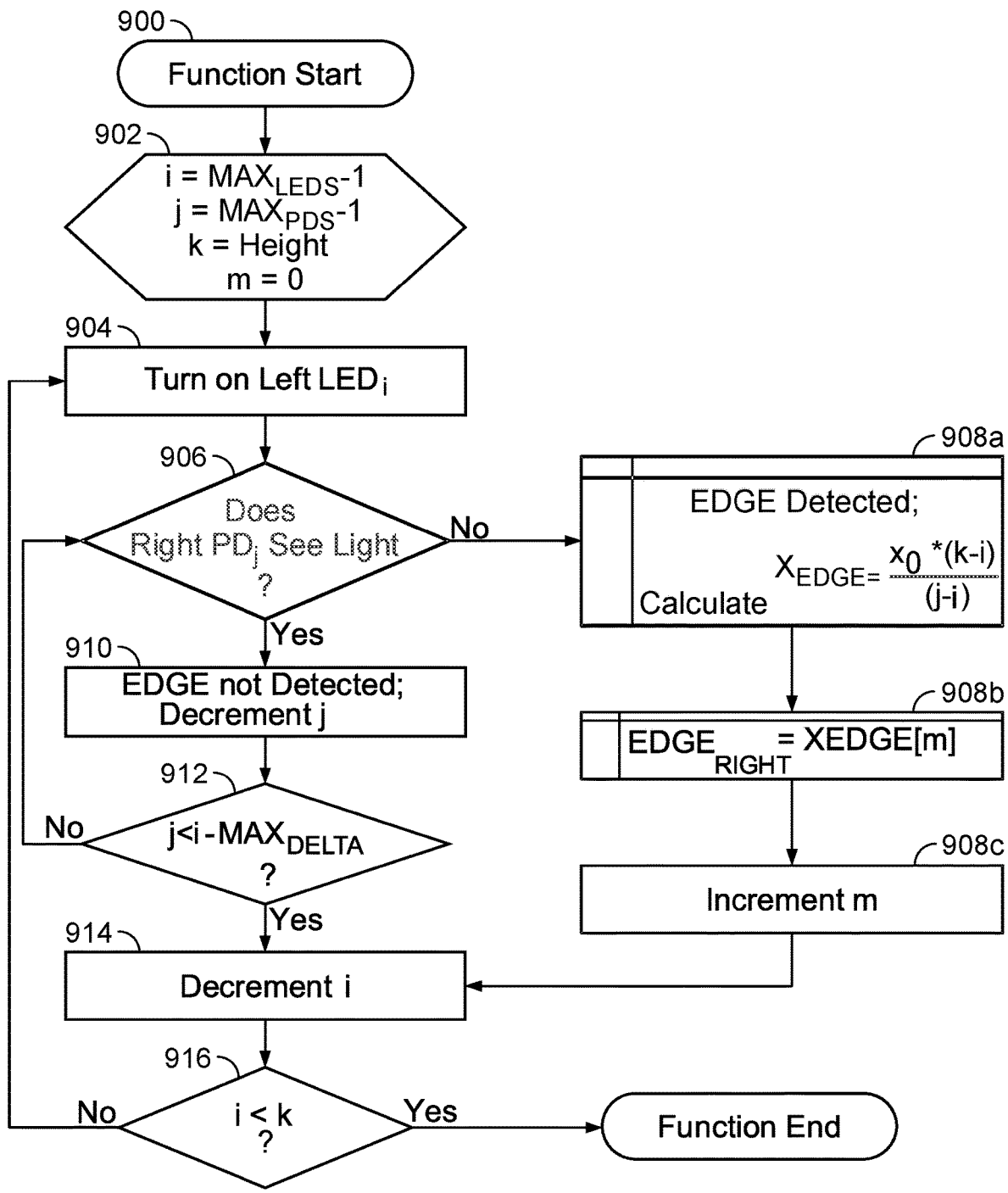
FIG. 9 is a flow diagram of another example of a process of a system including a light curtain assembly.

FIG. 9 is a flow diagram of an example of a process for performing an edge detection function in flowchart form. As described with reference to FIGS. 4B and 4C, FIG. 9 details the right edge scan function in flowchart form in further detail. The system initializes the start of the process 900. At step 902, the system initializes the respective indices of i, j, k, and m, where i is the LED index and initialized to a value equal to MAX$_{LEDs}$-1 (i.e., one fewer than the total number of LEDS available in the light-emitting array 304), where j is the PD index and initialized to a value equal to MAX$_{PDs}$-1 (i.e., one fewer than the total number of PDs available in the photodiode 310), where k is the index of the height that is determined (e.g., by process 800), and m is an index value initialized to 0.

At step 904, the system turns on left LED$_i$. In step 906, the system determines if the right PD$_j$ can detect the light emitted, based on the LED optical transmission and PD optical acceptance angle ranges. In response to the system determining that the right PD$_j$ does not detect the light emitted, in step 908a, the system calculates a right edge (EDGE$_{RIGHT}$) position. In step 908b, the system sets the right edge position equal to the edge position for the index m. In step 908c, the systems increments m. In response to the system determining that the right PD$_j$ does detect the light emitted, in step 910, the system decrements j (assuming that the value of j is determined by the system to not be less than i-MAX$_{DELTA}$ in step 912) and repeats processes 904-906.

In response to the system determining that the value of j is less than i-MAX$_{DELTA}$ in step 912, the system decrements i in step 914. If the system determines in step 916 that i is greater than k, then the system repeats processes 904-906. In response to the system determining in step 916 that i is less than k, the system terminates the process.

Though described here with reference to determining a right edge of the item, to scan item's left edge, the system can perform a similar process as described with reference to FIG. 9 to determine the left edge of the item by substituting Right LED and Left PD to find EDGE$_{LEFT}$.

Figure 10:
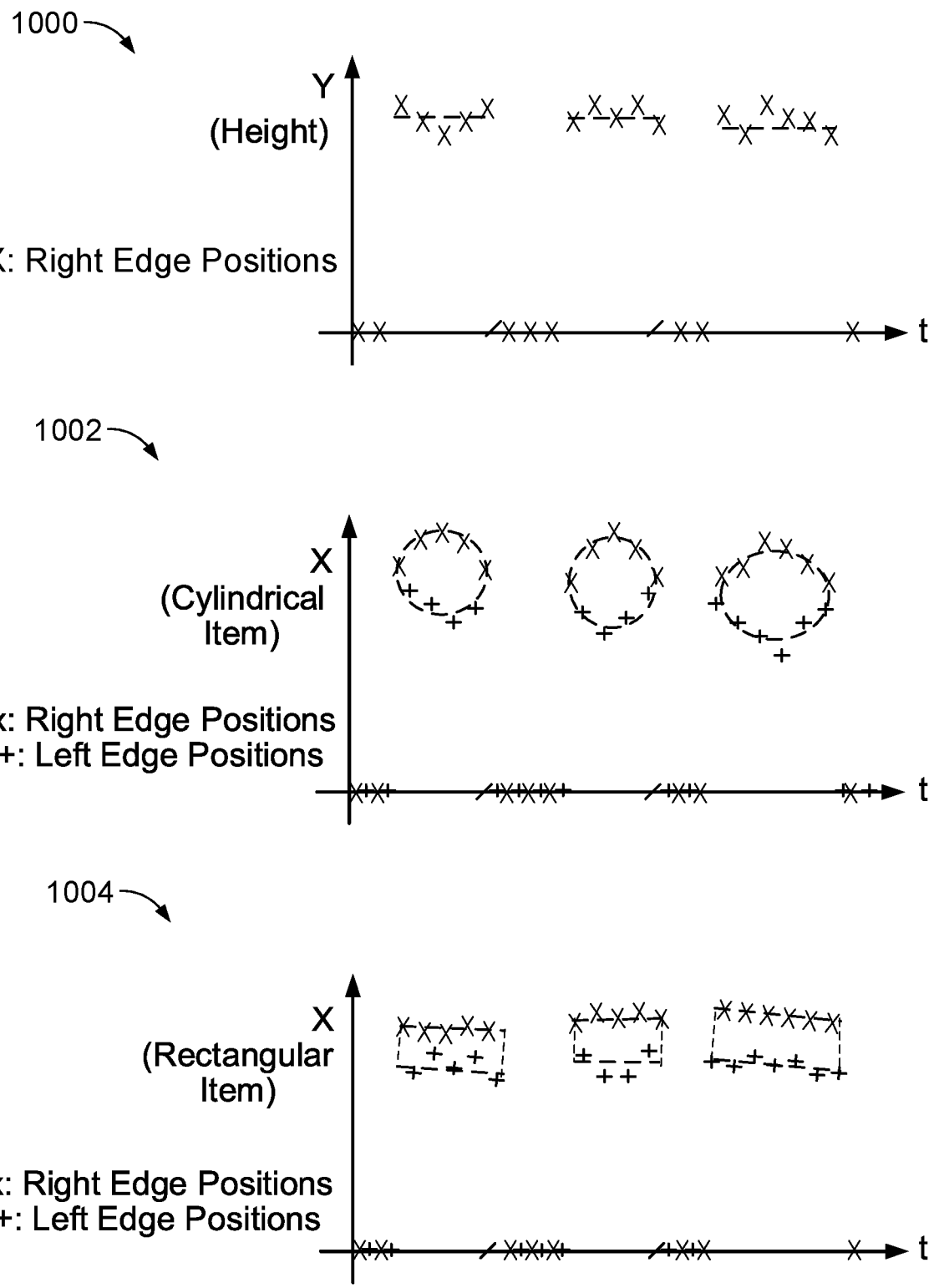
FIG. 10 depicts examples of time sequences of data for a system including a light curtain assembly.

FIG. 10 depicts examples of time sequences 1000, 1002, and 1004 of data collected using processes described above with reference to FIGS. 7-9. For example, time sequence 1000 measures the height on the right side of three items. The x-axis of each time sequence 1000, 1002, and 1004 has two axis breaks indicated by a slanted dash on the x-axis, e.g., each of the time sequences 1000, 1002, 1004 has individual position versus time plots for each of the three items. For each item in time sequences 1002 and 1004, measurements alternate in time between the right and left edge positions.

Time sequence 1002 measures both the right (represented by an "X") and left (represented by a "+") edge positions of a cylindrical item. The dashed lines, as in not the right or left edges marked by +'s and X's, indicate the shape of the item as seen from above. Time sequence 1000 can be paired with time sequence 1002 to gather three-dimensional information about the cylindrical items. Time sequence 1004 measures both the right and left edge positions of a rectangular item, its shape indicated by the dashed lines. Time sequence 1000 can be paired with time sequence 1004 to gather three-dimensional information about the rectangular items.

Figure 11:
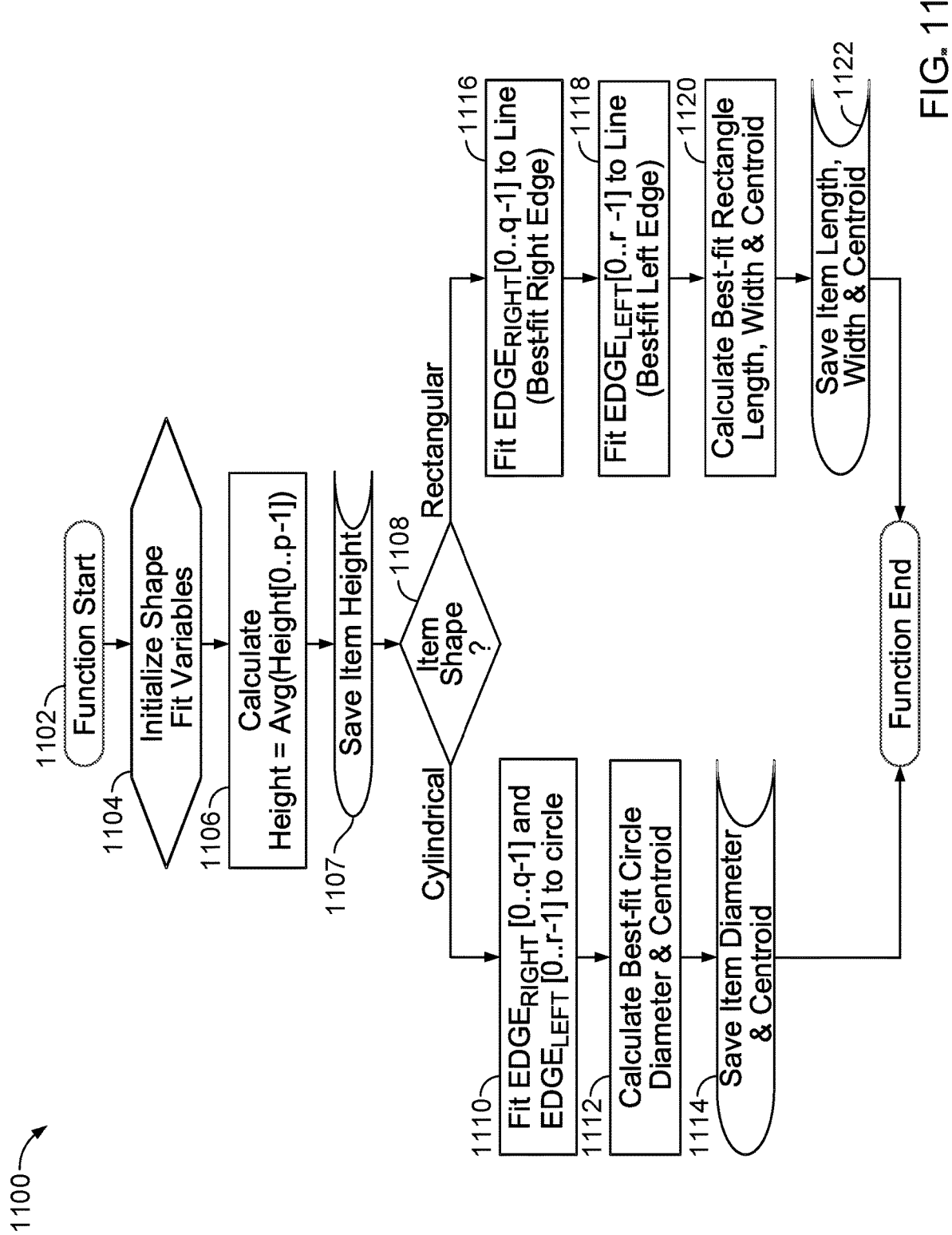
FIG. 11 is a flow diagram of another example process of a system including a light curtain assembly.

FIG. 11 is a flow diagram of another example of a process 1100 of a system including a light curtain assembly. Process 1100 is an example process according to some embodiments for performing a height scan, a right edge scan, and a left edge scan for an item (e.g., steps 712-716).

In step 1102, prior to operation, a user may specify whether the items to be measured are cylindrical or rectangular in nature. In step 1104, the system can initialize shape fit variables based on user input of characteristics of the items to be measured (e.g., expect dimensions, expected shape, etc.).

In step 1106, the system calculates the height of an item, e.g., as described above with reference to step 712. In some implementations, the calculated height is an average of all the measured heights.

In step 1107, the system saves the item height.

In steps 1108, the system determines a shape of the item, e.g., either cylindrical or rectangular. In steps 1110-1114, the system determines a shape of the item when the item is cylindrical. To determine the shape of the cylindrical item, the system collects right-side measurements for a can shape with lip including lip edge position (e.g., x, y, z), lip arc fit, and outer diameter arc fit, as described above with reference to FIG. 7.

In step 1110, the system fits the values in $EDGE_{RIGHT}[0, \ldots, q-1]$ and $EDGE_{LEFT}[0, \ldots r-1]$ to an equation for a circle, e.g., each X and Y coordinate in $EDGE_{RIGHT}[0, \ldots, q-1]$ and $EDGE_{LEFT}[0, \ldots r-1]$ obeys the equation $(X-a)^2+(Y-b)^2=radius^2$, where a and b are the coordinates (a,b) for the center of a circle, within a threshold value. Any approach with a loss function can be used to find the equation of best fit.

In step 1112, the system calculates the best-fit circle diameter and centroid, e.g., the system determines the values for the center of the circle (a,b) and the diameter (twice the radius) that minimize the loss function.

In step 1114, the system saves the values for the item diameter and centroid.

In steps 1116-1122, the system determines a shape of the item when the item is rectangular. To determine the shape of the rectangular item, the system collects right-side measurements for the rectangular item including outer edge positions (e.g., x, y, z) of the item and an outer edge line fit (e.g., using contour measurement process described with reference to FIG. 6).

In step 1116, the system fits the values in $EDGE_{RIGHT}[0, \ldots, q-1]$ to a line, e.g., uses a numerical solver to fit the X and Y coordinates $EDGE_{RIGHT}[0, \ldots, q-1]$ to y=mx+b, where m is the slope and b is the y-intercept.

In step 1118, the system fits the values in $EDGE_{LEFT}[0, \ldots, r-1]$ to a line, e.g., uses a numerical solver to fit the X and Y coordinates $EDGE_{LEFT}[0, \ldots, r-1]$ to y=mx+b, where m is the slope and b is the y-intercept.

In step 1120, the systems calculates a best-fit rectangle length, width, and centroid. For example, the system could choose a rectangle with one pair of opposite sides with a slope that is an average of slope of the best-fit lines for $EDGE_{RIGHT}[0, \ldots, q-1]$ and $EDGE_{LEFT}[0, \ldots, r-1]$. The system could choose a rectangle that has width that is the average width of the line segment defined by $EDGE_{RIGHT}[0, \ldots, q-1]$ and $EDGE_{LEFT}[0, \ldots, r-1]$. The system could choose a rectangle that has a height that is the average distance between corresponding values in $EDGE_{RIGHT}[0, \ldots, q-1]$ and $EDGE_{LEFT}[0, \ldots, r-1]$. The system could choose a rectangle that has a centroid that is the average of all the coordinates in $EDGE_{RIGHT}[0, \ldots, q-1]$ and $EDGE_{LEFT}[0, \ldots, r-1]$.

In step 1122, the system saves the item length, width, and height according to the best-fit rectangle.

FIG. 12 is a flow diagram of another example of a process of a system including a light curtain assembly. Process 1200 is an example of a process according to some embodiments for performing a validation function. The system can compare measured dimensions in the stored measured slice against known dimensions (also stored at the system) for the item in question.

In step 1202, the process is initialized to validate the expected item characteristics. A set of characteristics to validate can be identified by a user prior to the initialization of the validation process, e.g., the user may select to validate item height, position, shape (e.g., diameter, length/width), etc. The user may additionally select tolerances for each characteristic, i.e., error threshold between measured characteristics and nominal characteristics, which may depend on the measurement being validated (e.g., a first tolerance for height, a second tolerance for width/length), (e.g., +/−4 mm, −1 to +2 mm, +/−3 to +/−5 mm, etc.).

In step 1204 the system determines if a measured item height is within tolerance (e.g., based on a measured height as determined in FIGS. 7 and 8). In response to determining that the measured height of the item is outside of tolerance, the system generates in step 1206 a height error. In response to determining that the measured height of the item is within tolerance, the system validates the height before proceeding to step 1210.

In step 1210, the system determines if a measured item position on the support is within a tolerance. In response to determining that the measured position of the item (e.g., as depicted in FIG. 6) is outside of tolerance, the system generates, in step 1212, a position error. In response to determining that the measured position of the item is within tolerance, the system validates the position before proceeding to step 1216.

In step 1216, the system determines a shape of the item, e.g., the user may provide expected shape of the item (i.e., the user may specify the shape as cylindrical or rectangular).

If the shape of the item is cylindrical, the system determines in validation step 1218 if the measured diameter of the shape (e.g., as described with reference to FIG. 11) is within tolerance. In response to the system determining that the measured diameter of the cylindrical item is not within tolerance, the system can generate a diameter error in step 1220. In response to determining that the measured diameter of the item is within tolerance, the system validates the diameter (and/or shape) of the item before proceeding to step 1236.

If the shape of the item is rectangular, the system determines in validation step 1224 if the measured length of the shape (e.g., as described with reference to FIG. 11) is within tolerance. In response to the system determining that the measured length of the rectangular item is not within tolerance, the system generates length error in step 1226. In response to determining that the measured length of the item is within tolerance, the system validates the length of the item before proceeding to step 1230.

The system determines in step 1230 if the measured width of the item (e.g., as described with reference to FIG. 11) is within tolerance. In response to the system determining that the measured width of the item is not within tolerance, the system generates a width error in step 1232. After generating a width error, the system can terminate the error program in step 1234. In response to the system determining that the measured width of the item is within tolerance, the system validates the item width, then terminates for a normal function in step 1236.

In each case that the system generates an error during a validation step (in response to steps 1204, 1210, 1218, 1224, 1230), the function will terminate in step 1236 and can generate an error control signal. If the measurements are verified in response to the steps 1204 and 1210 and the shape-based validation steps (e.g., in response to validation step 1218 for the cylindrical shape, e.g., in response to validation steps 1224 and 1230 for the rectangular shape), then the process proceeds to a normal function termination in step 1236.

Figure 13:
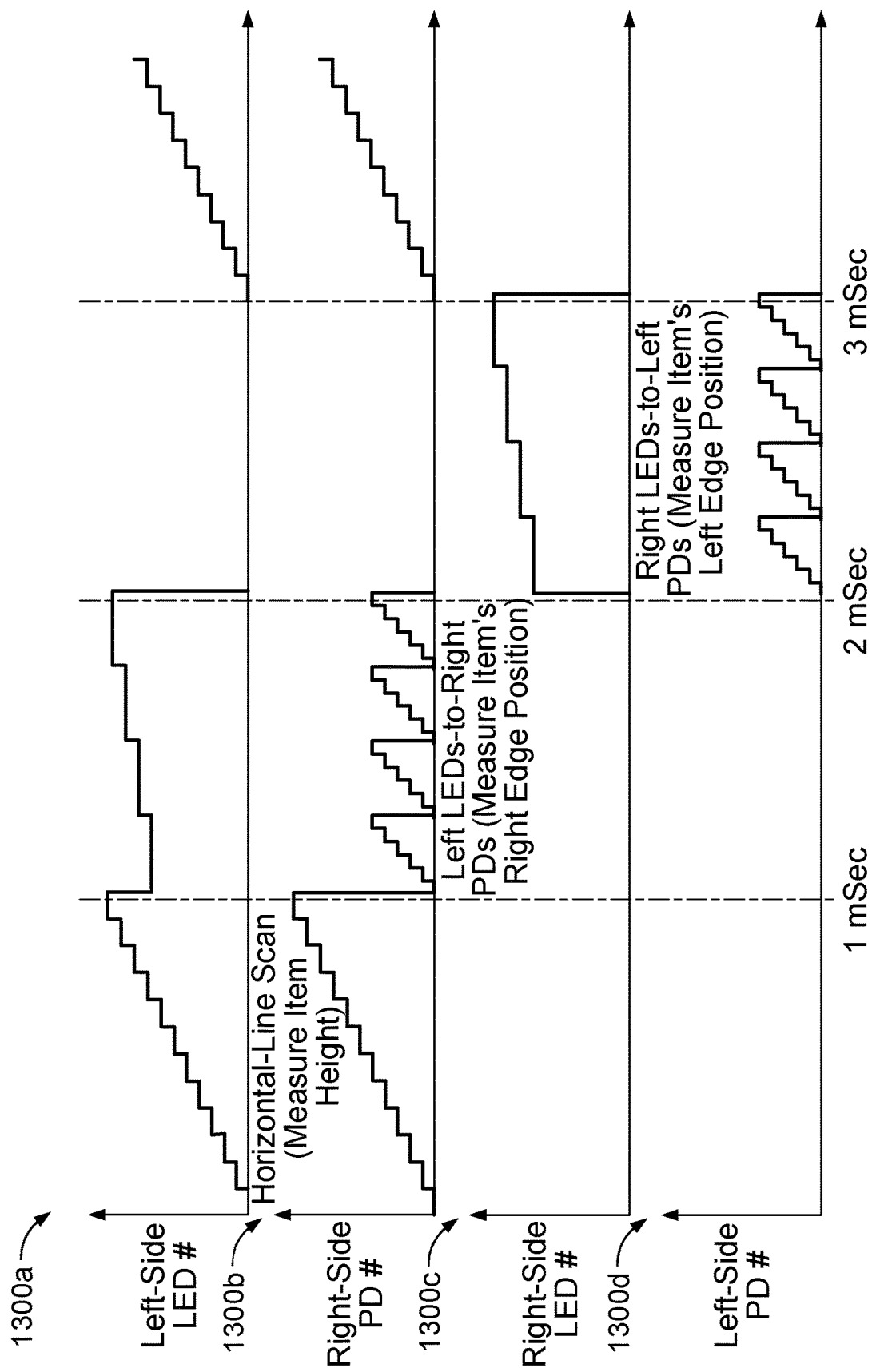
FIG. 13 depicts timing diagrams for a system including a light curtain assembly.

FIG. 13 depicts timing diagrams 1300a-d for a system including a light curtain assembly. As depicted in FIG. 13, timing diagrams 1300a and 1300b of the left-side light emitting array (e.g., light-emitting array 304) and the right-side PD array (e.g., PD array 310) and timing diagrams 1300c and 1300d of the right-side light emitting array (e.g., light emitting array 504) and left-side PD array (e.g., PD array 506) to detect right and left edges, respectively, along a top of the product are used to measure product characteristics, such as length, width, shape, and the curvature of the top edge. The system can utilize the timing diagrams 1300a-d to determine conveyer belt speed by comparing the edge locations determined to known product dimensions. Product measurements can be utilized to validate that a correct product has been loaded onto the conveyer belt. Moreover, if the edge locations reflect that an object located on the conveyer belt is not an expected product, e.g., a hand, that has been detected by the light curtain assembly, the system can deactivate a hazard (e.g., deactivate a laser, robot, thermal devices, etc.).

Timing diagrams 1300a and 1300b for the first millisecond can complement each other. The left-side LEDs are turned on sequentially from the bottom up, while the corresponding right-side photodiodes are enabled. This allows a straight-horizontal scan to measure the item's height. Timing diagrams 1300a and 1300b represent the address, e.g., height location, of the LED or PD enabled at a particular time. The scan stops when the address of the last PD is reached. Timing diagrams 1300a and 1300b do not show whether light was detected at a given PD, but that a particular address was activated.

Between the first and second milliseconds, the top four LEDs, e.g., $LED_{N-3}$ to $LED_N$ if there are N LEDs, are enabled, one at a time, on the same side. This allows detection of light via PDs near the bottom of the PD array, e.g., near the conveyer height. Consequently, timing diagram 1300b has the angled shape, which indicates where the item's right edge is located.

Later, between the second and third millisecond, the respective left side process occurs, as represented by timing diagrams 1300c and 1300d, using the right-side LEDs and left-side PDs. Each of the four top LEDs repeats this measurement, and the individual measurements can be combined to estimate the edge position more precisely.

In some implementations, an object can be non-perfectly rectangular or cylindrical. For example, secondary packaging, e.g., corrugate boxes for shipping, can be overstuffed and appear slightly convex compared to an exact rectangular prism. Secondary packaging can also have inconsistent case squaring, leading to non-parallel edges of the box. Further, some materials used in shipping tend to bend with applied pressure, so their faces can appear concave compared to an exact rectangle. Additionally, gaps can occur in secondary packaging. In some implementations, such as high-quality printing, the distance between a box and a printer should be known at a millimeter or even submillimeter resolution. An additional sensor for distance measurement can be placed after a light curtain, for use when the system has determined the object to be rectangular.

Figure 14:
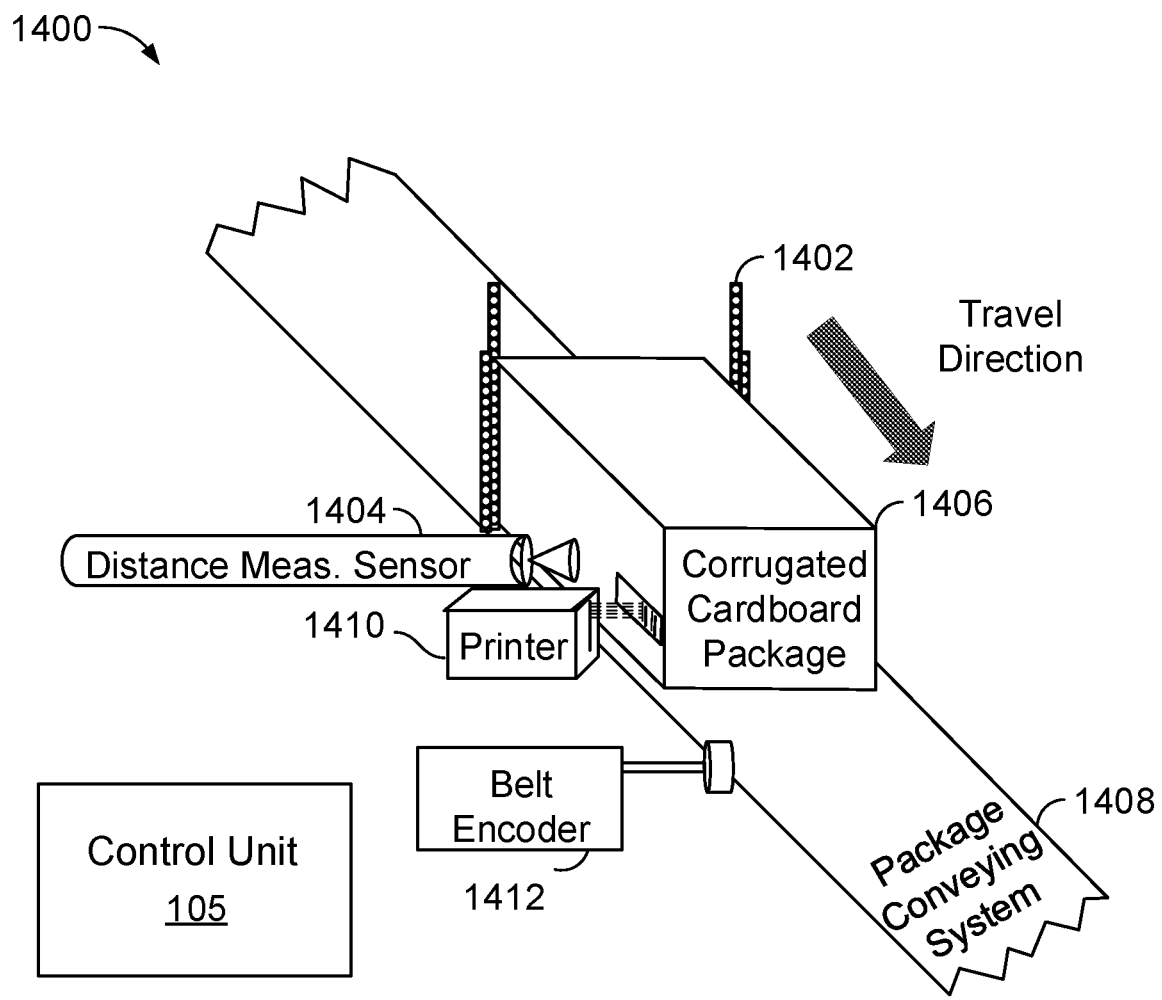
FIG. 14 depicts an example of a system including a light curtain assembly and distance measure sensor.

FIG. 14 depicts an example system 1400 with a light curtain 1402 and distance measure sensor 1404. A package 1406 travels on conveyer belt 1408, through the light curtain 1402 and toward the distance measure sensor 1404. The distance measure sensor can activate when the light curtain has determined the shape of the package 1406 to be generally rectangular. In some implementations, the distance measure sensor 1404 can utilize RADAR, LIDAR, ultrasonic, or optical triangulation (an imaging sensor). Ultrasonic, LIDAR, and RADAR can provide measurement update rates of about 100 measurements per second, 333 measurements per second, and 5 measurements per second, respectively. Ultrasonic, LIDAR, and RADAR can provide distance measurement resolution of about 0.1 mm, 0.1 mm, and 4-16 mm, respectively. Ultrasonic, LIDAR, and RADAR can provide spatial measurement resolution of 25 mm by 25 mm from 50 mm away, 8 mm by 8 mm from 1 m away, and 300 mm by 300 mm from 500 mm away, respectively. Ultrasonic and LIDAR sensors can be appropriate for relatively large and slow processes for certain objects, such as corrugate boxes. LIDAR sensors and laser triangulation can be appropriate for relatively fast moving objects, such as cans for beverages.

Given the location of the distance measure sensor 1404, the distance measure sensor 1404 and light curtain 1402 can avoid cross-talk from interfering electromagnetic signals. The distance measure sensor 1404 can provide dynamic distance measurement to the print surface, as well as additional object characterization, e.g., box bulginess or curvature. With this information, the control unit 105 can more accurately determine the settings of a printer 1410 when printing on the package 1406. A belt encoder 1412 can provide operating instructions, capture sampling data, perform measurements, and perform other functions related to the system 1400.

Combining the capabilities of the light curtain 1402, e.g., a LED array, and the distance measure sensor 1404 can allow for three-dimensional profiling of the package 1406. For example, FIG. 15A shows how the measurements of the light curtain 1402 and the distance measure sensor 1404 can be combined. The top plot 1501 shows the data gathered by the light curtain 1402, which can detect the contours of the object, with "x" indicating right edge positions and "+" indicating left edge positions. The system can detect that the object is generally rectangular, although some of the objects are rotated. Middle plot 1503 shows the data collected by a distance measure sensor, which measures the distance from the sensor to the plane of the side of the package that will be printed upon, with the three objects having rectilinear, convex, and skew parallelogram edges, respectively. Bottom plot 1505 shows how the top plot 1501 and middle plot 1503 can be superimposed to assess the shape of the object. Bottom plot 1505 can allow determination of the concavity or convexity of a package, the package rotation, and how square or skew the package construction is.

FIGS. 15B and 15C show more detail of data collected by the distance measure sensor. The blue line measures the LED-measured distance to the left edge, e.g., the distance measured by the light curtain to the side to be printed. The purple line measures the distance-measure-sensor measured distance to the edge to be printed. Graph 1507 shows an example of results for a rectilinear object with the face to be printed moving parallel to the direction of travel along the conveyor belt. The two distances, e.g., the distance 1507A between the LED to the printer side and the distance 1507B between the distance sensor and the printer side remain roughly constant as the object passes in front of the LED and distance sensor. Graph 1509 shows an example of results for a rectilinear object with a face to be printed rotated with respect to the direction of travel along the conveyor belt. The two distances 1509A and 1509B increase at the same rate as the rotated object passes in front of the LED and distance sensor. Graph 1511 shows results for both an object with a convex or concave side to be printed, aligned parallel to the direction of travel along the conveyor belt. The distance 1511A measured by the LED remains roughly constant as it passes in front of the LED, while the distance 1511B symmetrically decreases then increases for the distance sensor measure.

Graph 1513 shows results for an object with a convex or concave side to be printed, rotated with respect to the direction of travel along the conveyor belt. The distance 1513A measured by the LED increases in a roughly linear fashion, while the distance 1513B measured by the distance has a convex trend. Graph 1515 shows results for an object with a skew parallelogram shape, aligned parallel to the direction of travel along the conveyor belt. The distance 1515A measured by the LED increases roughly linearly, while the distance 1515B measured by the distance sensor decreases roughly linearly. Graph 1517 shows results for an object with a skew parallelogram shape, rotated with respect to the direction of travel along the conveyor belt. The distance 1517A measured by the LED increases roughly linearly, while the distance 1517B measured by the distance sensor remains roughly constant. In all of the plots, the combination of the two measurements, e.g., from the LED array and distance measure sensor, allows for the system to determine the appropriate distance to use when printing.

FIG. 16 depicts another example of a system 1600 including a light curtain assembly 1602. In some embodiments, light curtain assembly 1602 includes a support frame 1604 arranged in an arc or curved shape around a product support (e.g., conveyor belt 1606). Light sources, e.g., LEDs 1608 represented by white circles, and photodiodes (PDs) 1610 represented by black circles can be arranged along the support frame 1604. As depicted in FIG. 16, LEDs 1608 can emit from different positions along the support frame 1604 and light signals from the LEDs 1608 can be detected by respective PDs 1610 at other locations along the support frame 1604. The respective locations at which each LED 1608 and each PD 1610 (which detects the emitted light signal) are located along the support frame can be utilized to define lateral positions of edges 1614 of a product 1612 as the product passes between the support frame 1604.

The arc configuration of FIG. 16 does not change the transmission or detection angles of individual LEDs and PDs, respectively, but can provide greater position measurement accuracy with items of particular shapes.

The system 1600 as depicted in FIG. 16 can be utilized to perform triggering for various manufacturing functions (e.g., triggering a printer), monitoring a belt encoder function, safety/hazard enforcement, position determination (e.g., x, y, and z positions of the product on the conveyor belt), shape determination/verification, and the like.

Figure 17A:
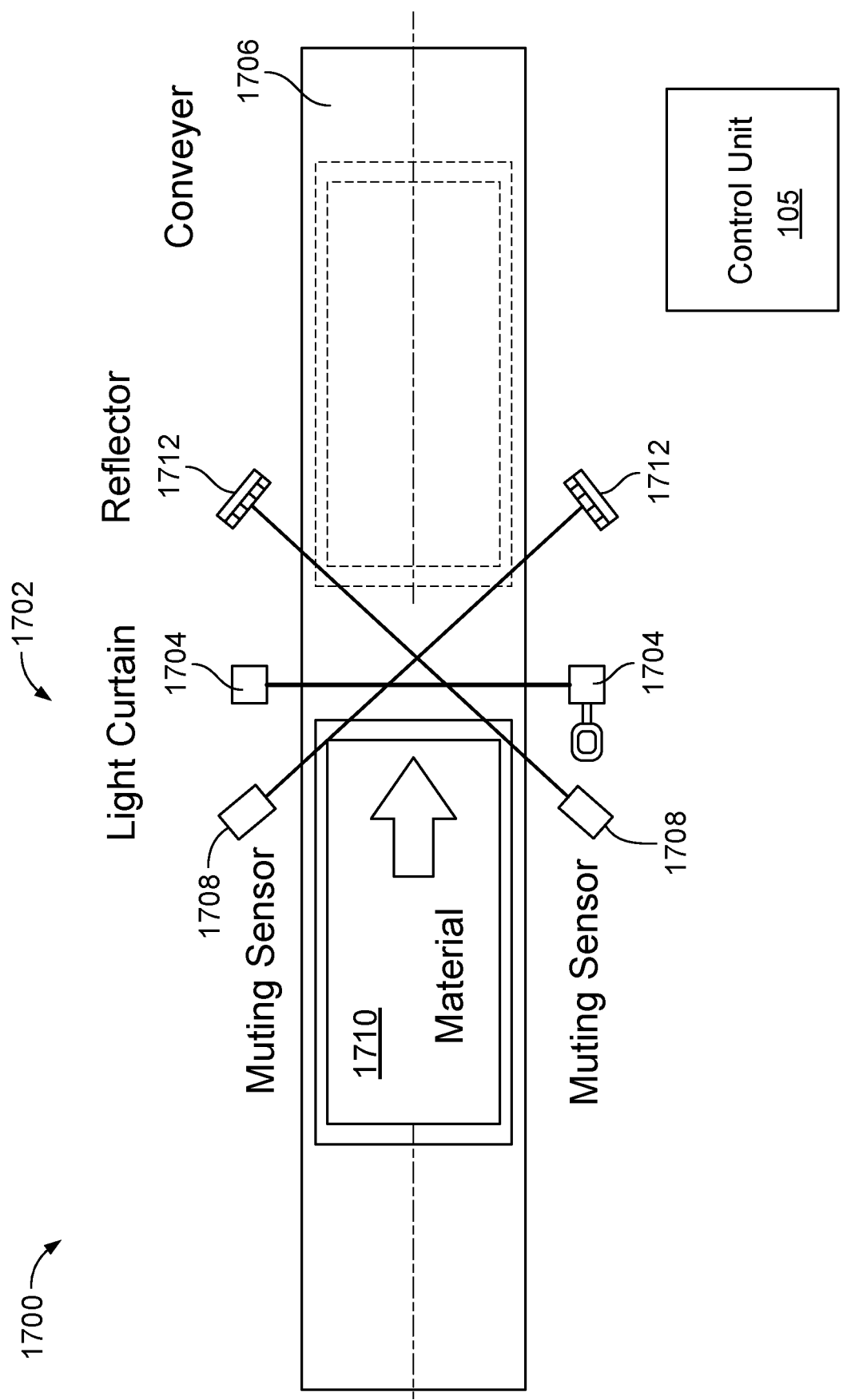
FIGS. 17A and 17B depict additional examples of systems including light curtain assemblies.

FIG. 17A depicts another example of a system 1700 including a light curtain assembly 1702. Light curtain assembly 1702 can include two or more light curtains 1704 arranged in a crossing configuration with respect to a product support (e.g., conveyor belt 1706). Each light curtain 1704 can be configured as described above to include a light emitting array and a photodiode array, each including respective sets of LEDs and PDs.

System 1700 relies on reflectance, rather than transmission to measure distances. In other words, rather than analyzing how light is transmitted from an LED to a PD, a sensor can measure properties of light reflected off a component in system 1700. Some embodiments include one or more light curtains 1704 and a reflective laser ranging assembly, e.g., muting sensors 1708 and reflectors 1712 arranged on opposite sides of the conveyor belt. Each laser in light curtain 1704 can be modulated by a sinusoidal wave, generally with a frequency greater than 100 Mhz. Each laser can emit light, which will reflect off of a product 1710. A muting sensor 1708, e.g., a photodiode, next to each laser in light curtain 1704 can measure the sinusoidal wave reflected off the product 1710. The phase shift between the emitted and measured light can determine the distance between the light curtain 1704 and product 1710. The two or more light curtains 1704 can generate additional information, e.g., size variation, incorrect product detections, product wobble detection, and product sliding detection, that the system 1700 can utilize to validate the product 1710 located on the conveyor belt 1706.

Though the systems and techniques are described herein in the context of a specific orientation for clarity, these systems and techniques can also be implemented to detect edges other than the top edges of products. In some instances, different orientations of a product with respect to the product support (e.g., the conveyor) and the light curtain assembly or light curtain assemblies are also possible.

Figure 17B:
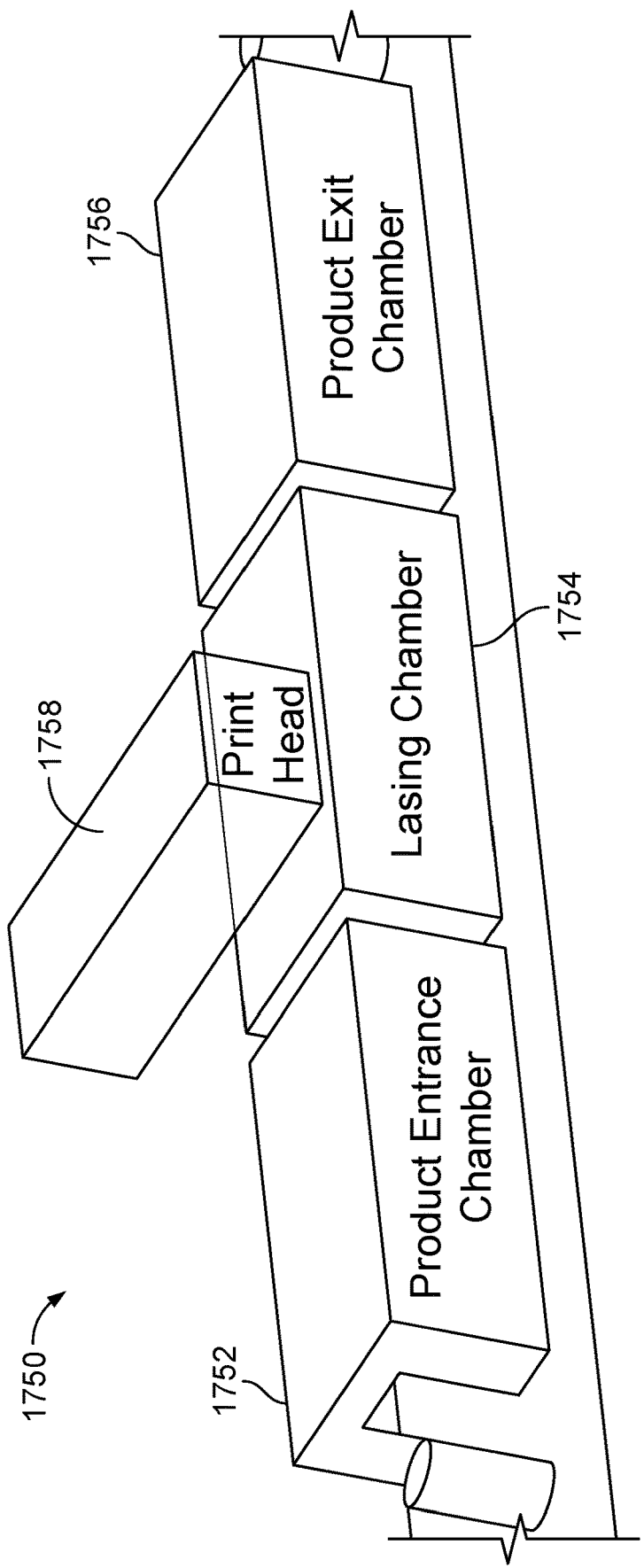

Additionally, the systems and techniques are described herein can complement preexisting technology such as lasing chambers. For example, light curtains can replace product entrance and exit chambers in a product monitoring system, being placed before and after a lasing chamber. FIG. 17B shows a system 1750, which can include a product entrance chamber 1752, a lasing chamber 1754, a product exit chamber 1756, and a print head 1758. System 1700 with light curtain assembly 1702 could replace product entrance chamber 1752, and a reversed version of system 1700 with light curtain assembly 1702 could replace product exit chamber 1756. For example, the product 1710 could pass, along the conveyor belt 1706, either into the lasing chamber from a light curtain assembly 1702 or out of the lasing chamber through a light curtain assembly 1702.

Figure 18:
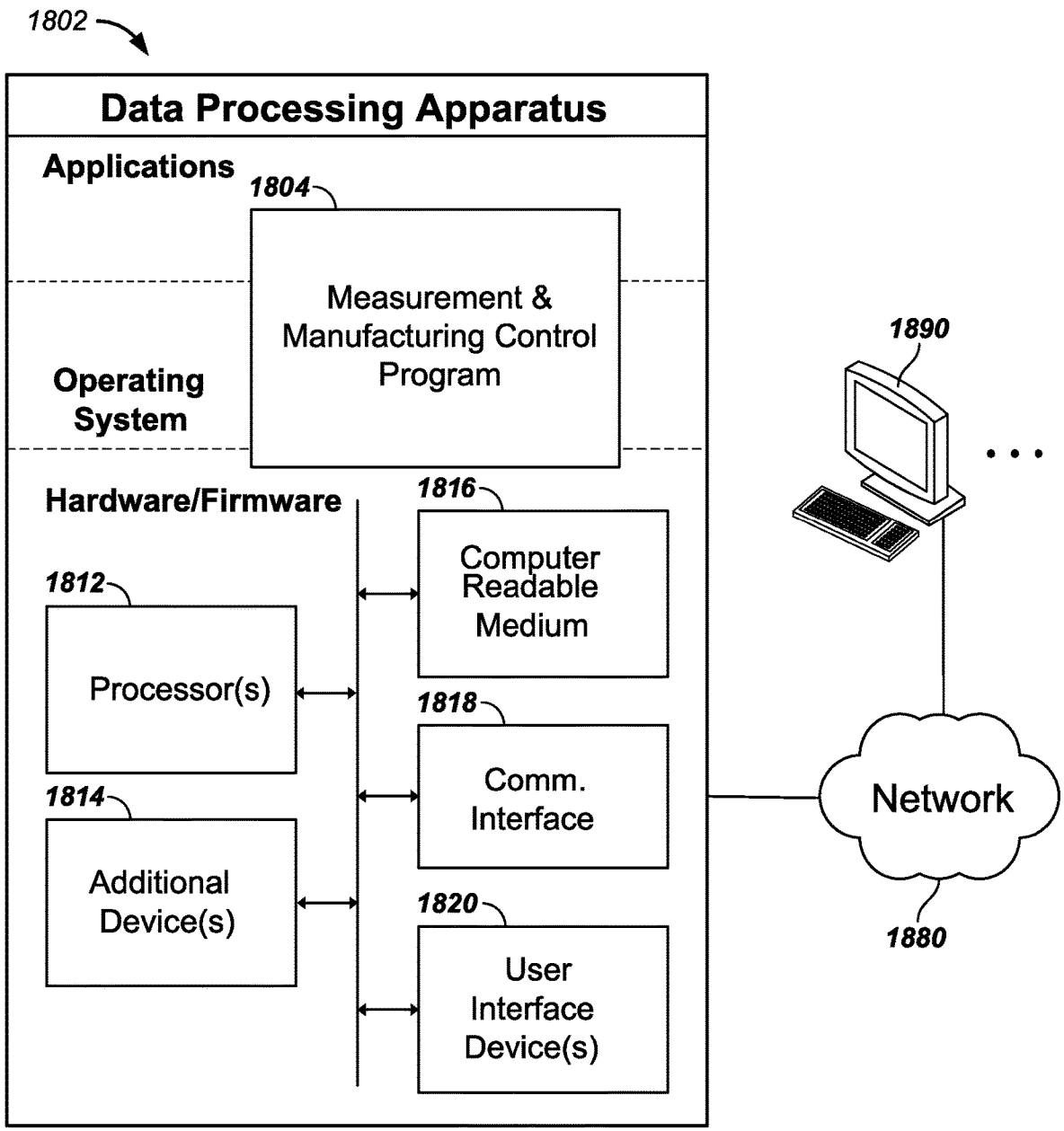
FIG. 18 is a schematic diagram of a data processing system usable to implement the described systems and techniques.

FIG. 18 is a schematic diagram of a data processing system including a data processing apparatus 1802 which can be programmed as a client or as a server. The data processing apparatus 1802 is connected with one or more computers 1890 through a network 1880. While only one computer is shown in FIG. 18 as the data processing apparatus 1802, multiple computers can be used. The data processing apparatus 1802 includes various software, firmware and/or hardware modules, which can be distributed between an applications layer and an operating system. These can include executable and/or interpretable software programs or libraries, firmware and/or hardware components, including tools and services of a measurement and manufacturing control program 1804 that implement the systems and techniques described above. The number of modules used can vary from one implementation to another. Moreover, the modules can be distributed on one or more data processing apparatus connected by one or more computer networks or other suitable communication networks.

The data processing apparatus 1802 also includes hardware or firmware devices including one or more processors 1812, one or more additional devices 1814, a computer readable medium 1816, a communication interface 1818, and one or more user interface devices 1820. Each processor 1812 is capable of processing instructions for execution within the data processing apparatus 1802. In some implementations, the processor 1812 is a single or multi-threaded processor. Each processor 1812 is capable of processing instructions stored on the computer readable medium 1816 or on a storage device such as one of the additional devices 1814. The data processing apparatus 1802 uses the communication interface 1818 to communicate with one or more computers 1890, for example, over the network 1880. Examples of user interface devices 1820 include; a display; camera; speaker; microphone; tactile feedback device; keyboard; mouse; and VR and/or AR equipment. The data processing apparatus 1802 can store instructions that implement operations associated with the program(s) described above, for example, on the computer readable medium 1816 or one or more additional devices 1814, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions, and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including: semiconductor memory devices (e.g., Erasable Programmable Read-Only Memory (EPROM) and Electrically Erasable Programmable Read-Only Memory (EEPROM); flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD), an organic light emitting diode (OLED), or another monitor for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

Examples

Although the present application is defined in the attached claims, it should be understood that the present invention can also (additionally or alternatively) be defined in accordance with the following examples:

A System for Providing Product Information

Example 1: A system comprising:
a support frame arranged around a transport path comprising a product support;
a light-emitting array comprising a plurality of light sources arranged along the support frame, each light source of the plurality of light sources arranged along the support frame at a respective distance above the product support;
a detector array comprising a plurality of light detectors, wherein each detector of the plurality of light detectors is arranged on the support frame opposite the transport path from a light source of the plurality of light sources and at a respective distance above the product support; and
a data processing apparatus in data communication with the light-emitting array and the detector array and configured to perform operations comprising:
measuring a height of a product on the product support as the product passes through the support frame by at least determining a first detector of the plurality of light detectors that detects light from a first light source of the plurality of light sources during sequential light signal emissions by the plurality of light sources;
measuring edge locations of the product by at least determining second detectors of the plurality of light detectors that detect light from second light sources of the plurality of light sources during light signal emissions by the second light sources, wherein the second light sources are only those light sources of the plurality of light sources that are above or below the first light source of the plurality of light sources with respect to the product support, and wherein the second detectors are only those light detectors of the plurality of light detectors that are below or above the first detector;
verifying, from the measured height and edge locations of the product, that the product on the product support matches an expected product;
in response to determining that the product matches the expected product:
determining product information comprising i) a speed of the product, ii) a location of the product, iii) dimensions of the product, iv) a shape of the product, v) product vibration, vi) a product trigger, or vii) a combination thereof; and
providing the product information; and
in response to determining that the product does not match the expected product i) providing an alert, ii) stopping further motion of the product on the product support, iii) disabling hazardous energy, or iv) a combination thereof.

Example 2: The system of Example 1, wherein the support frame comprises vertical supports arranged on either side of the transport path comprising the product support.

Example 3: The system of Example 1 or Example 2, wherein the light-emitting array comprises a first set of light sources arranged on a vertical support located on a right side of the transport path and a second set of light sources arranged on a vertical support located on an opposite, left side of the transport path Example 4: The system of Example 3, wherein the detector array comprises a first set of light detectors arranged on the vertical support located on the right side of the transport path and a second set of light detectors arranged on the vertical support located on the left side of the transport path.

Example 5: The system of any of the preceding Examples, wherein the light sources comprise light-emitting diodes Example 6: The system of any of the preceding Examples, wherein each of the light sources has an associated transmission angle of at least 4° degrees Example 7: The system of Example 6, wherein each of the light sources is designed to spread light over an angle of at least +/−10 degrees to provide the associated transmission angle.

Example 8: The system of Example 6 or Example 7, comprising a plurality of prisms or lenses configured and arranged to shift the associated transmission angle by a selected amount.

Example 9: The system of any of the preceding Examples, wherein the light detectors comprise photodiodes.

Example 10: The system of any of the preceding Examples, wherein each of the light detectors has an associated acceptance angle of at least 4° degrees.

Example 11: The system of Example 10, wherein each of the light detectors is designed to accept light over an angle of at least +/−10° degrees to provide the associated acceptance angle.

Example 12: The system of Example 10 or Example 11, comprising a plurality of prisms or lenses configured and arranged to shift the associated acceptance angle by a selected amount.

Example 13: The system of any of the preceding Examples, wherein the support frame comprises an arc frame arranged around the transport path comprising the product support.

Example 14: The system of any of the preceding Examples, further comprising a second light source comprising a laser, and a second light detector comprising a camera.

Example 15: The system of any of the preceding Examples, further comprising a muting sensor and a reflector arranged on opposing sides of the transport path comprising the product support.

Example 16: The system of any of the preceding Examples, wherein measuring edge locations of the product comprises: measuring a right edge location of the product; and measuring a left edge location of the product, wherein measuring the right edge location of the product comprises determining second detectors of the plurality of light detectors on a right side of the transport path that detect light from second light sources of the plurality of light sources on a left side of the transport path, and wherein measuring the left edge location of the product comprises determining second detectors of the plurality of light detectors on a left side of the transport path that detect light from second light sources of the plurality of light sources on a right side of the transport path.

Example 17: The system of any of the preceding Examples, wherein measuring edge locations of the product further comprises, determining, from a lookup table, a subset of the second detectors and a subset of the second light sources based in part on the measured height of the product.

Example 18: The system of any of the preceding Examples, wherein at least one light source of the light-emitting array is arranged on the support frame at a height above the product support that is greater than a height of the product supported by the product support.

Example 19: The system of any of the preceding Examples, further comprising a lasing chamber, wherein the product passes, on the product support, either into or out of the lasing chamber.

Example 20: The system of any of the preceding Examples, further comprising a distance measure sensor, wherein the product passes, on the product support, from the light-emitting array and the detector array and toward the distance measure sensor.

Similar operations and processes as describes in Examples 1 to 19 can be performed in a system or data processing apparatus comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations as described in any one of the Examples 1 to 13 can also be implemented.

What is claimed is:

1. A system comprising:
   a support frame arranged around a transport path comprising a product support;
   a light-emitting array comprising a plurality of light sources arranged along the support frame, each light source of the plurality of light sources arranged along the support frame at a respective distance above the product support;
   a detector array comprising a plurality of light detectors, wherein each detector of the plurality of light detectors is arranged on the support frame opposite the transport path from a light source of the plurality of light sources and at a respective distance above the product support; and
   a data processing apparatus in data communication with the light-emitting array and the detector array and configured to perform operations comprising:
      measuring a height of a product on the product support as the product passes through the support frame by at least determining a first detector of the plurality of light detectors that detects light from a first light source of the plurality of light sources during sequential light signal emissions by the plurality of light sources;
      measuring edge locations of the product by at least determining second detectors of the plurality of light detectors that detect light from second light sources of the plurality of light sources during sequential light signal emissions by the second light sources, wherein the light-emitting array is a linear array, the detector array is a linear array, the sequential light signal emissions by the second light sources occur after the sequential light signal emissions by the plurality of light sources, and determining the second detectors comprises detecting an edge of the product using the sequential light signal emission by the second light sources, which are only those light sources of the plurality of light sources that are above or below the first light source of the plurality of light sources with respect to the product support, and wherein the second detectors are only those light detectors of the plurality of light detectors that are below or above the first detector;
      verifying, from the measured height and edge locations of the product, that the product on the product support matches an expected product;
      in response to determining that the product matches the expected product:
         determining product information comprising i) a speed of the product, ii) a location of the product, iii) dimensions of the product, iv) a shape of the product, v) product vibration, vi) a product trigger, or vii) a combination thereof; and
         providing the product information; and
      in response to determining that the product does not match the expected product i) providing an alert, ii) stopping further motion of the product on the product support, iii) disabling hazardous energy, or iv) a combination thereof.

2. The system of claim 1, wherein the support frame comprises vertical supports arranged on either side of the transport path comprising the product support.

3. The system of claim 2, wherein the light-emitting array comprises a first set of light sources arranged on a vertical support located on a right side of the transport path and a second set of light sources arranged on a vertical support located on an opposite, left side of the transport path.

4. The system of claim 3, wherein the detector array comprises a first set of light detectors arranged on the vertical support located on the right side of the transport path and a second set of light detectors arranged on the vertical support located on the left side of the transport path.

5. The system of claim 1, wherein the light sources comprise light-emitting diodes.

6. The system of claim 1, wherein each of the light sources has an associated transmission angle of at least 4° degrees.

7. The system of claim 6, wherein each of the light sources is designed to spread light over an angle of at least +/−10 degrees to provide the associated transmission angle.

8. The system of claim 7, comprising a plurality of prisms or lenses configured and arranged to shift the associated transmission angle by a selected amount.

9. The system of claim 1, wherein the light detectors comprise photodiodes.

10. The system of claim 1, wherein each of the light detectors has an associated acceptance angle of at least 4° degrees.

11. The system of claim 10, wherein each of the light detectors is designed to accept light over an angle of at least +/−10° degrees to provide the associated acceptance angle.

12. The system of claim 11, comprising a plurality of prisms or lenses configured and arranged to shift the associated acceptance angle by a selected amount.

13. The system of claim 1, wherein the support frame comprises an arc frame arranged around the transport path comprising the product support.

14. The system of claim 1, further comprising a second light source comprising a laser, and a second light detector comprising a camera.

15. The system of claim 1, further comprising a muting sensor and a reflector arranged on opposing sides of the transport path comprising the product support.

16. The system of claim 1, wherein measuring edge locations of the product comprises:
measuring a right edge location of the product; and
measuring a left edge location of the product,
wherein measuring the right edge location of the product comprises determining second detectors of the plurality of light detectors on a right side of the transport path that detect light from second light sources of the plurality of light sources on a left side of the transport path, and
wherein measuring the left edge location of the product comprises determining second detectors of the plurality of light detectors on a left side of the transport path that detect light from second light sources of the plurality of light sources on a right side of the transport path.

17. The system of claim 1, wherein measuring edge locations of the product further comprises, determining, from a lookup table, a subset of the second detectors and a subset of the second light sources based in part on the measured height of the product.

18. The system of claim 1, wherein at least one light source of the light-emitting array is arranged on the support frame at a height above the product support that is greater than a height of the product supported by the product support.

19. The system of claim 1, further comprising a lasing chamber, wherein the product passes, on the product support, either into or out of the lasing chamber.

20. The system of claim 1, further comprising a distance measure sensor, wherein the product passes, on the product support, from the light-emitting array and the detector array and toward the distance measure sensor.

* * * * *